US012526748B2

United States Patent
Cui et al.

(10) Patent No.: US 12,526,748 B2
(45) Date of Patent: Jan. 13, 2026

(54) SYSTEMS AND METHODS FOR CONTROLLING UPLINK DUTY CYCLE

(71) Applicant: Apple Inc., Cupertino, CA (US)

(72) Inventors: Jie Cui, San Jose, CA (US); Sharad Sambhwani, San Diego, CA (US); Yang Tang, San Jose, CA (US); Hong He, San Jose, CA (US); Dawei Zhang, Saratoga, CA (US); Wei Zeng, Saratoga, CA (US); Haitong Sun, Cupertino, CA (US); Yuchul Kim, San Jose, CA (US); Yushu Zhang, Beijing (CN); Chunhai Yao, Beijing (CN); Chunxuan Ye, San Diego, CA (US); Weidong Yang, San Diego, CA (US); Zhibin Wu, Los Altos, CA (US); Dirk Nickisch, Oberpframmern (DE)

( * ) Notice: Subject to any disclaimer, the term of this patent is extended or adjusted under 35 U.S.C. 154(b) by 440 days.

(21) Appl. No.: 17/894,047

(22) Filed: Aug. 23, 2022

(65) Prior Publication Data

US 2022/0408369 A1    Dec. 22, 2022

Related U.S. Application Data

(63) Continuation of application No. 17/868,637, filed on Jul. 19, 2022, which is a continuation of application
(Continued)

(51) Int. Cl.
*H04W 52/14* (2009.01)
*H04B 1/3827* (2015.01)
(Continued)

(52) U.S. Cl.
CPC ........ *H04W 52/146* (2013.01); *H04B 1/3838* (2013.01); *H04W 52/242* (2013.01);
(Continued)

(58) Field of Classification Search
None
See application file for complete search history.

(56) References Cited

U.S. PATENT DOCUMENTS

| 8,325,061 B2 * | 12/2012 | Groves | G01N 33/0075 |
| | | | 340/901 |
| 8,825,102 B2 * | 9/2014 | Chakraborty | H04W 52/346 |
| | | | 455/67.11 |

(Continued)

FOREIGN PATENT DOCUMENTS

| CN | 109964513 A | 7/2019 |
| CN | 110476302 A | 11/2019 |

(Continued)

OTHER PUBLICATIONS

Qualcomm Incorporated, Further details on agreed signaling methods, 3GPP TSG-RAN WG4 Meeting #94, Feb. 14, 2020, Qualcomm Incorporated, San Diego, California, United States.

(Continued)

*Primary Examiner* — Tuan A Tran
(74) *Attorney, Agent, or Firm* — Treyz Law Group, P.C.; Michael H. Lyons

(57) ABSTRACT

A wireless network may include a base station and user equipment (UE). The UE may transmit uplink (UL) signals to the base station using a dynamically adjustable maximum UL duty cycle. When the UE identifies that a user is in proximity to the UE, the UE may transmit an indicator to the base station. The indicator may identify that a radio-frequency exposure (RFE) event has occurred and/or a suggested maximum UL duty cycle that would allow the UE to satisfy limits on RFE. The base station may limit a UL grant to the UE so that the UE performs subsequent communications using the suggested maximum UL duty cycle or a different maximum UL duty cycle. Coordinating adjustment of UL duty cycle in this way may allow the UE to meet limits
(Continued)

on RFE without requiring the UE to perform maximum transmit power level reductions.

17 Claims, 14 Drawing Sheets

Related U.S. Application Data

No. 17/790,933, filed as application No. PCT/CN2021/094103 on May 17, 2021.

(51) Int. Cl.
| | | |
|---|---|---|
| *H04W 52/24* | (2009.01) | |
| *H04W 52/36* | (2009.01) | |
| *H04W 72/1268* | (2023.01) | |
| *H04W 72/23* | (2023.01) | |
| *H04W 72/542* | (2023.01) | |

(52) U.S. Cl.
CPC ..... *H04W 52/367* (2013.01); *H04W 72/1268* (2013.01); *H04W 72/23* (2023.01); *H04W 72/542* (2023.01)

(56) References Cited

U.S. PATENT DOCUMENTS

| | | | | |
|---|---|---|---|---|
| 8,831,528 | B2 * | 9/2014 | Shi | H04W 52/288 |
| | | | | 455/67.11 |
| 8,995,938 | B2 * | 3/2015 | Ali | H04B 1/3838 |
| | | | | 455/127.1 |
| 9,144,028 | B2 * | 9/2015 | Faraone | H04W 52/146 |
| 9,848,430 | B2 * | 12/2017 | Stanwood | H04L 5/0023 |
| 10,587,299 | B1 * | 3/2020 | Sahoo | H01Q 1/245 |
| 10,965,335 | B1 * | 3/2021 | Jadhav | H04B 1/3838 |
| 11,310,751 | B2 * | 4/2022 | Liu | H04W 52/367 |
| 11,330,534 | B2 * | 5/2022 | Gheorghiu | H04W 52/367 |
| 11,387,860 | B2 * | 7/2022 | Jadhav | H04B 1/3838 |
| 11,432,249 | B1 * | 8/2022 | Sambhwani | H04W 52/42 |
| 11,463,229 | B2 * | 10/2022 | Youtz | H04W 72/1268 |
| 11,617,180 | B2 * | 3/2023 | Zhou | H04W 72/53 |
| | | | | 370/329 |
| 11,689,235 | B2 * | 6/2023 | Zhou | H04B 7/0691 |
| | | | | 370/329 |
| 11,695,443 | B2 * | 7/2023 | Jadhav | H04W 52/367 |
| | | | | 455/522 |
| 11,757,483 | B2 * | 9/2023 | Zhou | H04B 7/063 |
| | | | | 370/252 |
| 11,785,556 | B2 * | 10/2023 | Cha | H04W 52/367 |
| | | | | 455/202 |
| 11,855,738 | B2 * | 12/2023 | Zhou | H04B 7/0834 |
| 11,917,552 | B2 * | 2/2024 | Cha | H04W 52/34 |
| 12,003,266 | B2 * | 6/2024 | Zhou | H04W 72/535 |
| 12,004,086 | B2 * | 6/2024 | Zhao | H04W 52/367 |
| 12,041,539 | B2 * | 7/2024 | Tang | H04W 52/02 |
| 12,069,584 | B2 * | 8/2024 | Kiilerich Pratas | H04W 52/246 |
| 12,081,254 | B2 * | 9/2024 | Jadhav | H04B 1/3838 |
| 12,120,144 | B2 * | 10/2024 | Lekies | H04L 63/1433 |
| 2020/0021421 | A1 * | 1/2020 | Han | H04W 52/367 |
| 2020/0112927 | A1 | 4/2020 | Han et al. | |
| 2020/0383067 | A1 * | 12/2020 | Liu | H04W 52/367 |
| 2021/0058918 | A1 * | 2/2021 | Zhou | H04B 17/102 |
| 2021/0167937 | A1 * | 6/2021 | Youtz | H04W 52/146 |
| 2021/0329602 | A1 * | 10/2021 | Zhang | H04W 52/267 |
| 2023/0328641 | A1 * | 10/2023 | Tang | H04W 52/38 |
| | | | | 370/311 |

FOREIGN PATENT DOCUMENTS

| | | |
|---|---|---|
| CN | 111066350 A | 4/2020 |
| EP | 2670054 A1 | 12/2013 |
| WO | 2020259852 A1 | 12/2020 |
| WO | 2021008710 A1 | 1/2021 |

OTHER PUBLICATIONS

Apple Inc., "Further considerations on the uplink duty cycle enhancements for the MPE scenario", 3GPP RAN WG4 Meeting #94-e, Feb. 24, 2020, Apple Inc., Cupertino, California, United States.
Intel Corporation, "Remaining issues for Rel-16 signaling solution", 3GPP RAN4 WG Meeting #94Bis-e, Apr. 20, 2020, Intel Corporation, Santa Clara, California, United States.

* cited by examiner

SYSTEMS AND METHODS FOR CONTROLLING UPLINK DUTY CYCLE

This application is a continuation of U.S. patent application Ser. No. 17/868,637, filed Jul. 19, 2022, which is a continuation of U.S. patent application Ser. No. 17/790,933, filed Jul. 5, 2022, which is a 371 of International Patent Application No. PCT/CN2021/094103, filed May 17, 2021, each of which is hereby incorporated by reference herein in its entirety.

FIELD

This disclosure relates generally to wireless networks and, more particularly, to wireless networks having electronic devices with wireless communications circuitry.

BACKGROUND

Electronic devices often include wireless communications circuitry. For example, cellular telephones, computers, and other devices often contain antennas and wireless transceivers for supporting wireless communications. The electronic devices communicate with wireless base stations in a wireless network.

Electronic devices with wireless capabilities are typically subject to regulatory limits on radio-frequency exposure. It can be difficult to provide satisfactory and efficient wireless communications between the wireless network and the electronic devices while ensuring that the regulatory limits are satisfied.

SUMMARY

A wireless network may include a base station having a corresponding cell. User equipment (UE) devices may be located within the cell and may communicate with the base station. The UE devices and the base station may communicate using a communications protocol such as a 3GPP Fifth Generation (5G) New Radio (NR) protocol. A UE device may use antenna(s) to transmit uplink (UL) signals to the base station using a maximum UL duty cycle. The maximum UL duty cycle may be dynamically adjustable. The network, base station, and UE device may rapidly coordinate dynamic adjustments to the maximum UL duty cycle.

The UE device may perform proximity detection operations to identify when a user or other human body is in proximity to the UE device. The UE device may transmit an indicator to the base station when the UE device detects a user or other human body in proximity to the UE device. The indicator may identify that a radio-frequency exposure (RFE) event has occurred, such that the UE device may need to adjust UL transmission to continue to satisfy regulatory limits on RFE. The UE device may identify a suggested maximum UL duty cycle that would allow the UE device to continue to satisfy the regulatory limits on RFE. The suggested maximum UL duty cycle may account for pathloss between the UE device and the base station if desired. The indicator may identify an RFE level produced at the UE device. The indicator may additionally or alternatively identify the suggested maximum UL duty cycle.

The base station may process the indicator to confirm that the UE device can use the suggested maximum UL duty cycle or to identify a different updated maximum UL duty cycle for the UE device. The base station may adjust a UL schedule for the UE device that limits the UL grant to the UE device so that the UE device performs subsequent communications using the suggested maximum UL duty cycle or the updated maximum UL duty cycle. If desired, the base station may provide a feedback signal identifying acceptance of the suggested maximum UL duty cycle or identifying the updated maximum UL duty cycle. Coordinating adjustment of UL duty cycle in this way may allow the UE device to continue to meet the regulatory limits on RFE without requiring the UE device to perform maximum transmit power level reductions, thereby optimizing UL communications and throughput for the UE device.

DETAILED DESCRIPTION

Figure 1:
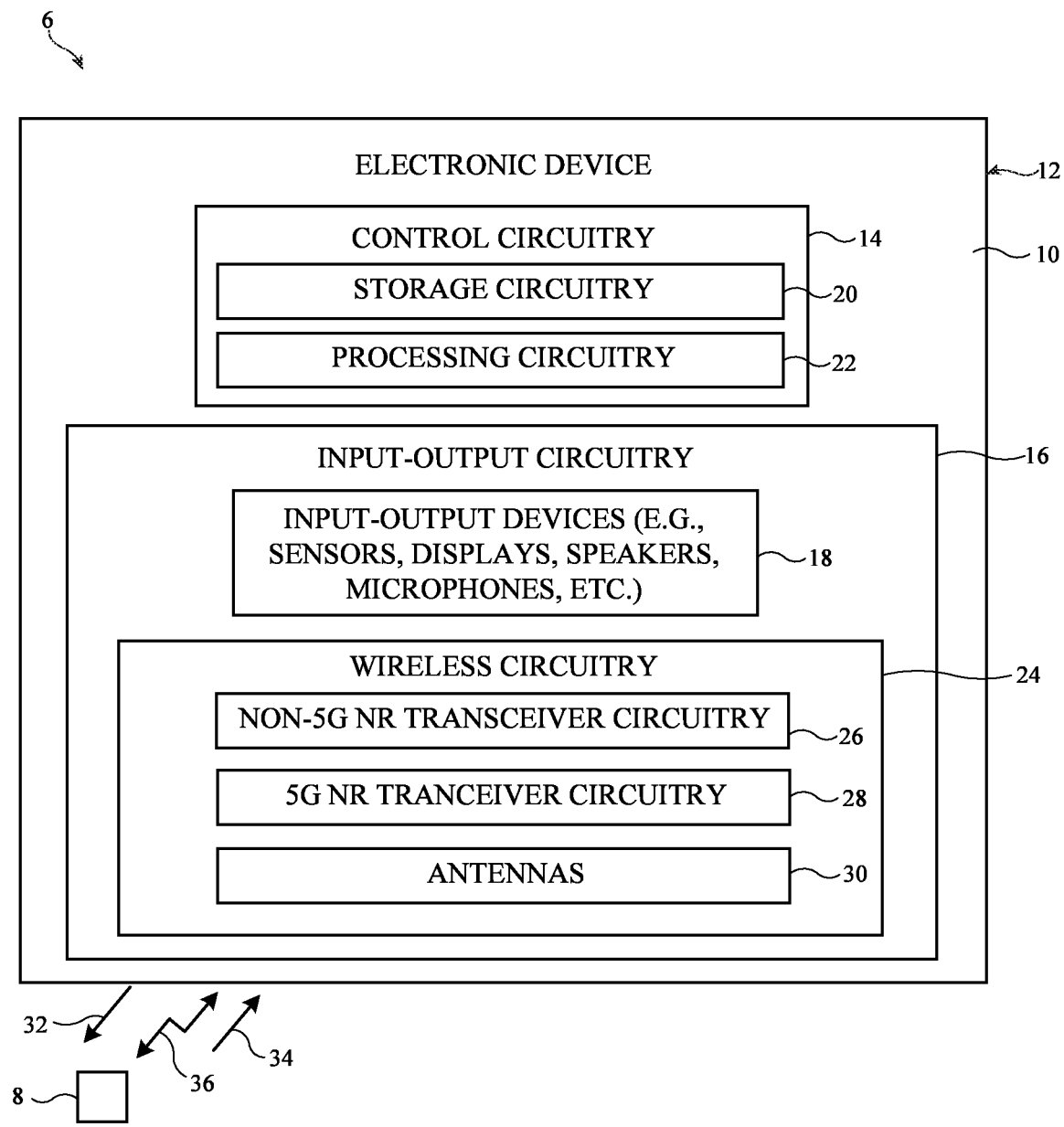
FIG. 1 is a functional block diagram of an illustrative electronic device having wireless circuitry for communicating with a wireless base station in accordance with some embodiments.

Electronic device 10 of FIG. 1 may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, equipment that implements the functionality of two or more of these devices, or other electronic equipment.

As shown in the functional block diagram of FIG. 1, device 10 may include components located on or within an electronic device housing such as housing 12. Housing 12, which may sometimes be referred to as a case, may be formed of plastic, glass, ceramics, fiber composites, metal (e.g., stainless steel, aluminum, metal alloys, etc.), other suitable materials, or a combination of these materials. In some situations, parts or all of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may include control circuitry 14. Control circuitry 14 may include storage such as storage circuitry 20. Storage circuitry 20 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 20 may include storage that is integrated within device 10 and/or removable storage media.

Control circuitry 14 may include processing circuitry such as processing circuitry 22. Processing circuitry 22 may be used to control the operation of device 10. Processing circuitry 22 may include on one or more microprocessors, microcontrollers, digital signal processors, host processors, baseband processor integrated circuits, application specific integrated circuits, central processing units (CPUs), graphics processing units (GPUs), etc. Control circuitry 14 may be configured to perform operations in device 10 using hardware (e.g., dedicated hardware or circuitry), firmware, and/or software. Software code for performing operations in device 10 may be stored on storage circuitry 20 (e.g., storage circuitry 20 may include non-transitory (tangible) computer readable storage media that stores the software code). The software code may sometimes be referred to as program instructions, software, data, instructions, or code. Software code stored on storage circuitry 20 may be executed by processing circuitry 22. If desired, portions of storage circuitry 20 may be located on processing circuitry 22 (e.g., as L1 and L2 cache), whereas other portions of storage circuitry 20 are located external to processing circuitry 22 (e.g., while remaining accessible to processing circuitry 22 via a memory interface).

Control circuitry 14 may be used to run software on device 10 such as satellite navigation applications, internet browsing applications, voice-over-internet-protocol (VOIP) telephone call applications, email applications, media playback applications, gaming applications, operating system functions, etc. To support interactions with external equipment, control circuitry 14 may be used in implementing communications protocols. Communications protocols that may be implemented using control circuitry 14 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 3GPP Fifth Generation (5G) New Radio (NR) protocols, etc.), antenna diversity protocols, satellite navigation system protocols (e.g., global positioning system (GPS) protocols, global navigation satellite system (GLONASS) protocols, etc.), antenna-based spatial ranging protocols (e.g., radio detection and ranging (RADAR) protocols or other desired range detection protocols for signals conveyed at millimeter and centimeter wave frequencies), or any other desired communications protocols. Each communications protocol may be associated with a corresponding radio access technology (RAT) that specifies the physical connection methodology used in implementing the protocol.

Device 10 may include input-output circuitry 16. Input-output circuitry 16 may include input-output devices 18. Input-output devices 18 may be used to allow data to be supplied to device 10 and to allow data to be provided from device 10 to external devices. Input-output devices 18 may include user interface devices, data port devices, and other input-output components. For example, input-output devices 18 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), etc. In some configurations, keyboards, headphones, displays, pointing devices such as trackpads, mice, and joysticks, and other input-output devices may be coupled to device 10 using wired or wireless connections (e.g., some of input-output devices 18 may be peripherals that are coupled to a main processing unit or other portion of device 10 via a wired or wireless link).

Input-output circuitry 16 may include wireless circuitry 24 to support wireless communications. Wireless circuitry 24 (sometimes referred to herein as wireless communications circuitry 24) may include one or more antennas 30. Wireless circuitry 24 may also include baseband processor circuitry, transceiver circuitry, amplifier circuitry, filter circuitry, switching circuitry, radio-frequency transmission lines, and/or any other circuitry for transmitting and/or receiving radio-frequency signals using antennas 30. While control circuitry 14 is shown separately from wireless circuitry 24 in the example of FIG. 1 for the sake of clarity, wireless circuitry 24 may include processing circuitry that forms a part of processing circuitry 22 and/or storage circuitry that forms a part of storage circuitry 20 of control circuitry 14 (e.g., portions of control circuitry 14 may be implemented on wireless circuitry 24). As an example, control circuitry 14 may include baseband processor circuitry or other control components that form a part of wireless circuitry 24. The baseband processor circuitry may, for example, access a communication protocol stack on control circuitry 14 (e.g., storage circuitry 20) to: perform user plane functions at a PHY layer, MAC layer, RLC layer, PDCP layer, SDAP layer, and/or PDU layer, and/or to perform control plane functions at the PHY layer, MAC layer, RLC layer, PDCP layer, RRC, layer, and/or non-access stratum layer. If desired, the PHY layer operations may additionally or alternatively be performed by radio-frequency (RF) interface circuitry in wireless circuitry 24.

Radio-frequency signals may be conveyed by wireless circuitry 24 using 3GPP 5G New Radio (5G NR) communications bands or any other desired communications bands (sometimes referred to herein as frequency bands or simply as bands). The radio-frequency signals may include millimeter wave signals, sometimes referred to as extremely high frequency (EHF) signals, which propagate at frequencies above about 30 GHz (e.g., at 60 GHz or other frequencies between about 30 GHz and 300 GHz). The radio-frequency signals may also additionally or alternatively include centimeter wave signals, which propagate at frequencies between about 10 GHz and 30 GHz. The radio-frequency signals may additionally or alternatively include signals at frequencies less than 10 GHz, such as signals between about 410 MHz and 7125 MHz. In scenarios where the radio-frequency signals are conveyed using 5G NR communications bands, the radio-frequency signals may be conveyed in 5G NR communications bands within 5G NR Frequency Range 2 (FR2), which includes centimeter and millimeter wave frequencies between about 24 GHz and 100 GHz, 5G NR communications bands within 5G NR Frequency Range 1 (FR1), which includes frequencies below 7125 MHz, and/or other 5G NR communications bands within other 5G NR frequency ranges FRx (e.g., where x is an integer greater than 2), which may include frequencies above around 57-60 GHz. If desired, device 10 may also contain antennas for handling satellite navigation system signals, cellular telephone signals (e.g., radio-frequency signals conveyed using long term evolution (LTE) communications bands or other non-5G NR communications bands), wireless local area network signals, near-field communications, light-based wireless communications, or other wireless communications.

For example, as shown in FIG. 1, wireless circuitry 24 may include radio-frequency transceiver circuitry that is used in conveying radio-frequency signals using the 5G NR communications protocol and RAT such as 5G NR transceiver circuitry 28. 5G NR transceiver circuitry 28 may support communications at frequencies between about 24 GHz and 100 GHz (e.g., within FR2, FRx, etc.) and/or at frequencies between about 410 MHz and 7125 MHz (e.g., within FR1). Examples of frequency bands that may be covered by 5G NR transceiver circuitry 28 include communications bands under the family of 3GPP wireless communications standards, communications bands under the IEEE 802.XX family of standards, an IEEE K communications band between about 18 GHz and 27 GHz, a $K_a$ communications band between about 26.5 GHz and 40 GHz, a $K_u$ communications band between about 12 GHz and 18 GHz, a V communications band between about 40 GHz and 75 GHz, a W communications band between about 75 GHz and 110 GHz, and/or other frequency bands between approximately 10 GHz and 110 GHz, a C-band between about 3300 MHz and 5000 MHz, an S-band between about 2300 MHz and 2400 MHz, an L-band between about 1432 MHz and 1517 MHz, and/or other frequency bands between approximately 410 MHz and 7125 MHz. 5G NR transceiver circuitry 28 may be formed from one or more integrated circuits (e.g., multiple integrated circuits mounted on a common printed circuit in a system-in-package or system-on-chip device, one or more integrated circuits mounted on different substrates, etc.). Wireless circuitry 24 may cover different frequency bands that are used in different geographic regions if desired.

Wireless communications using 5G NR transceiver circuitry 28 may be bidirectional. For example, 5G NR transceiver circuitry 28 may convey radio-frequency signals 36 to and from external wireless equipment such as external equipment 8. External equipment 8 may be another electronic device such as electronic device 10, may be a wireless access point, may be a wireless base station, etc. Implementations in which external equipment 8 is a wireless base station are sometimes described herein as an example. External equipment 8 may therefore sometimes be referred to herein as wireless base station 8 or simply as base station 8. Base station 8 may have control circuitry such as control circuitry 14 and wireless circuitry such as wireless circuitry 24 of device 10. The control circuitry on base station 8 and/or other portions of network 6 (e.g., control circuitry running on other base stations, cloud networks, virtual or logical networks, physical networks, wired networks, wireless networks, local area networks, servers, network nodes, routers, terminals, computing devices, switches, and/or any other desired components of network 6) may store, maintain, operate, update, process, and/or implement a network scheduler for base station 8. The network scheduler may be implemented using software and/or hardware running on network 6. The network scheduler may generate network (communications) schedules for each UE device in the cell of base station 8. The network schedules may identify (assign) time and/or frequency domain resources for use by each of the UE devices in communicating with base station 8 (e.g., under the 5G NR protocol). The network scheduler may include an uplink scheduler that schedules uplink resources and a downlink scheduler that schedulers downlink resources. In this way, the network scheduler may coordinate communications resources to allow base station 8 to provide satisfactory wireless communications and connectivity for each of the UE devices in its cell.

Device 10 and base station 8 may form part (e.g., nodes and/or terminals) of a wireless communications network such as communications network 6. Communications network 6 (sometimes referred to herein as network 6) may include any desired number of devices 10, base stations 8, and/or other network components (e.g., switches, routers, access points, servers, end hosts, local area networks, wireless local area networks, etc.) arranged in any desired network configuration. Network 6 may be managed by a wireless network service provider. Device 10 may also sometimes be referred to herein as user equipment (UE) 10 or UE device 10 (e.g., because device 10 may be used by an end user to perform wireless communications with the network). Base station 8 may operate within a corresponding cell that spans a particular geographic location or region. Base station 8 may be used to provide communications capabilities (e.g., 3GPP 5G NR communications capabilities) for multiple UE devices such as device 10 that are located within its cell. The air interfaces over which the UEs devices and base station 8 communicate may be compatible with 3GPP technical specifications (TSs) such as those that define 5G NR system standards.

Radio-frequency signals 36 (sometimes referred to herein as wireless link 36) may include radio-frequency signals transmitted by device 10 to base station 8 (e.g., in uplink direction 32) and radio-frequency signals transmitted by base station 8 to device 10 (e.g., in downlink direction 34). The radio-frequency signals 36 conveyed in uplink direction 32 may sometimes be referred to herein as uplink (UL) signals. The radio-frequency signals in downlink direction 34 may sometimes be referred to herein as downlink (DL) signals. Radio-frequency signals 36 may be used to convey wireless data. The wireless data may include a stream of data arranged into data packets, symbols, frames, etc. The wireless data may be organized/formatted according to the communications protocol governing the wireless link between device 10 and base station 8 (e.g., a 5G NR communications protocol). Wireless data conveyed by the uplink signals transmitted by device 10 (e.g., in uplink direction 32) may sometimes be referred to herein as uplink data. Wireless data conveyed by the downlink signals transmitted by base station 8 in (e.g., in downlink direction 34) may sometimes be referred to herein as downlink data. The wireless data may, for example, include data that has been encoded into corresponding data packets such as wireless data associated with a telephone call, streaming media content, internet browsing, wireless data associated with software applications running on device 10, email messages, etc. Control signals may also be conveyed in the uplink and/or downlink direction between base station 8 and device 10.

If desired, wireless circuitry 24 may also include transceiver circuitry for handling communications in non-5G NR communications bands such as non-5G NR transceiver circuitry 26. Non-5G NR transceiver circuitry 26 may include wireless local area network (WLAN) transceiver circuitry that handles 2.4 GHz and 5 GHz bands for Wi-Fi® (IEEE 802.11) communications, wireless personal area network (WPAN) transceiver circuitry that handles the 2.4 GHz Bluetooth® communications band, cellular telephone transceiver circuitry that handles cellular telephone communications bands from 700 to 960 MHz, 1710 to 2170 MHz, 2300 to 2700 MHz, and/or or any other desired cellular telephone communications bands between 600 MHz and 4000 MHz (e.g., cellular telephone signals conveyed using a 4G LTE protocol, a 3G protocol, or other non-5G NR protocols), GPS receiver circuitry that receives GPS signals at 1575 MHz or signals for handling other satellite positioning data (e.g., GLONASS signals at 1609 MHz, BeiDou Navigation Satellite System (BDS) band signals, etc.), television receiver circuitry, AM/FM radio receiver circuitry, paging system transceiver circuitry, near field communications (NFC) circuitry, ultra-wideband (UWB) transceiver circuitry that operates under the IEEE 802.15.4 protocol and/or other ultra-wideband communications protocols, etc. Non-5G NR transceiver circuitry 26 and 5G NR transceiver circuitry 28 may each include one or more integrated circuits, power amplifier circuitry, low-noise input amplifiers, passive radio-frequency components, filters, synthesizers, modulators, demodulators, modems, mixers, switching circuitry, transmission line structures, and other circuitry for handling radio-frequency signals. Non-5G NR transceiver circuitry 26 may transmit and receive radio-frequency signals below 10 GHz (and organized according to a non-5G NR communications protocol) using one or more antennas 30. 5G NR transceiver circuitry 28 may transmit and receive radio-frequency signals (e.g., at FR1 and/or FR2/FRx frequencies including frequencies above 57 GHz) using antennas 30.

5G NR transceiver circuitry 28 may, for example, include baseband processor circuitry. The baseband processor circuitry may process/generate baseband signals or waveforms that carry information in 3GPP-compatible networks such as network 6. If desired, the waveforms may be based on cyclic prefix orthogonal frequency-division multiplexing (CP-OFDM) in the uplink or downlink, and discrete Fourier transform spread OFDM (DFT-S-OFDM) in the uplink. 5G NR transceiver circuitry 28 may also include upconverter and/or downconverter circuitry (e.g., mixer circuitry) for converting signals between baseband and radio-frequencies, between baseband and intermediate frequencies, between baseband and radio-frequencies, and/or between intermediate frequencies and radio-frequencies.

In satellite navigation system links, cellular telephone links, and other long-range links, radio-frequency signals are typically used to convey data over thousands of feet or miles. In Wi-Fi® and Bluetooth® links at 2.4 and 5 GHz and other short-range wireless links, radio-frequency signals are typically used to convey data over tens or hundreds of feet. 5G NR transceiver circuitry 28 may convey radio-frequency signals over short distances that travel over a line-of-sight path. To enhance signal reception for 5G NR communications, and particularly for communications at frequencies greater than 10 GHz, phased antenna arrays and beam forming (steering) techniques may be used (e.g., schemes in which antenna signal phase and/or magnitude for each antenna in an array are adjusted to perform beam steering). Antenna diversity schemes may also be used to ensure that the antennas that have become blocked or that are otherwise degraded due to the operating environment of device 10 can be switched out of use and higher-performing antennas used in their place.

Antennas 30 in wireless circuitry 24 may be formed using any suitable antenna types. For example, antennas 30 may include antennas with resonating elements that are formed from stacked patch antenna structures, loop antenna structures, patch antenna structures, inverted-F antenna structures, slot antenna structures, planar inverted-F antenna structures, monopole antenna structures, dipole antenna structures, helical antenna structures, Yagi (Yagi-Uda) antenna structures, hybrids of these designs, etc. If desired, one or more of antennas 30 may be cavity-backed antennas. Different types of antennas may be used for different bands and combinations of bands. For example, one type of antenna may be used in forming non-5G NR wireless links for non-5G NR transceiver circuitry 26 and another type of antenna may be used in conveying radio-frequency signals in 5G NR communications bands for 5G NR transceiver circuitry 28. If desired, antennas 30 that are used to convey radio-frequency signals for 5G NR transceiver circuitry 28 may be arranged in one or more phased antenna arrays.

Figure 2:
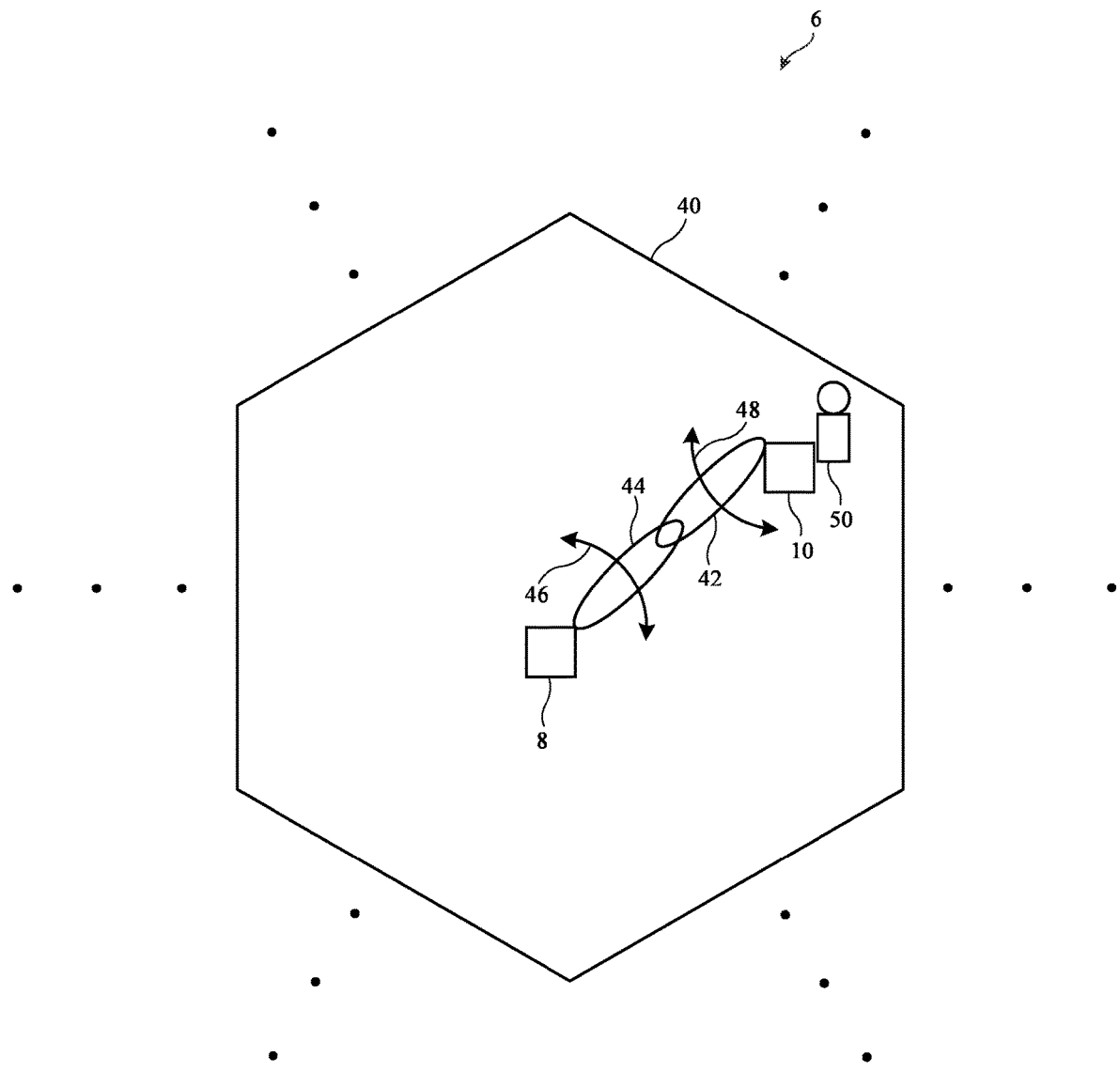
FIG. 2 is a diagram of an illustrative cell having a wireless base station and user equipment that communicate using steerable beams of radio-frequency signals in accordance with some embodiments.

FIG. 2 is a diagram showing how base station 8 may communicate with device 10 within a corresponding cell of network 6. As shown in FIG. 2, network 6 may be organized into one or more cells such as cell 40 distributed across one or more geographic areas or regions. Cell 40 may have any desired shape (e.g., a hexagonal shape, a rectangular shape, a circular shape, an elliptical shape, or any other desired shape having any desired number of straight and/or curved sides). Base station 8 may communicate with one or more UE devices within cell 40 such as device 10 (e.g., to provide communications access for device 10 to the rest of network 6, other UE devices, other networks, the Internet, etc.). While the storage and processing operations of base station 8 may sometimes be described herein as being performed by or at base station 8, some or all of the control circuitry for base station 8 (e.g., storage circuitry such as storage circuitry 20 and/or processing circuitry such as processing circuitry 22) may be located at base station 8 and/or may be distributed across two or more network devices in network 6 (e.g., any desired number of base stations, servers, cloud networks, physical devices, distributed and/or virtual/logical devices implemented via software, etc.).

When operating at relatively high frequencies such as frequencies greater than 10 GHz, the radio-frequency signals conveyed between base station 8 and device 10 may be subject to substantial over-the-air signal attenuation. In order to increase the gain of these signals, base station 8 and/or device 10 may convey the radio-frequency signals using phased antenna arrays (e.g., phased arrays of antennas 30). Each antenna in the phased antenna array may convey radio-frequency signals that are provided with a respective phase and magnitude. The signals conveyed by each antenna constructively and destructively interfere to produce a corresponding signal beam having a pointing direction (e.g., the direction of the signal beam having peak gain). The phases and/or magnitudes provided to each antenna may be adjusted to actively steer the signal beam in different directions.

For example, as shown in FIG. 2, device 10 may use a phased antenna array to convey radio-frequency signals (e.g., radio-frequency signals 36 of FIG. 1) over signal beam 42. Device 10 may adjust the phases/magnitudes provided to each antenna in the phased antenna array to point signal beam 42 in a selected pointing direction (e.g., the direction of peak gain), as shown by arrow 48. Similarly, base station 8 may use a phased antenna array to convey radio-frequency signals over signal beam 44. Base station 8 may adjust the phases/magnitudes provided to each antenna in the phased antenna array to steer signal beam 44 to point in a selected pointing direction, as shown by arrow 46. Base station 8 may steer signal beam 44 to point towards device 10 and device 10 may steer signal beam 42 to point towards base station 8 to allow wireless data to be conveyed between base station 8 and device 10. Phased antenna arrays may also sometimes be referred to as phased array antennas (e.g., phased arrays of antenna elements). The signal beam directions may be adjusted over time as device 10 moves relative to base station 8. Handover operations may be performed with other base stations in network 6 as device 10 moves between cells 40.

Device 10 may transmit uplink signals to base station 8 (sometimes referred to herein as gNB 8) within signal beam 42. Device 10 may transmit the uplink signals at a selected output power level (sometimes referred to herein as an uplink output power level, transmission power level, or transmit power level). Device 10 may have a maximum output power level $P_{CMAX}$ (e.g., the maximum output power level with which device 10 can transmit radio-frequency signals within signal beam 42). The output power level may be adjusted using an uplink (UL) power control operation. In cellular networks, UL power control can be a complicated process that includes an open loop power control operation during initial access (e.g., during a physical random access channel (PRACH) process), followed by a closed loop power control operation when the UE device is in connection with the network (e.g., when the UE and the base station convey physical uplink shared channel (PUSCH) signals, physical uplink control channel (PUCCH) signals, sounding reference signals (SRS), etc.).

During radio-frequency signal transmission, some of the radio-frequency signals transmitted by device 10 may be incident upon external objects such as external object 50. External object 50 may be, for example, the body of the user of device 10 or another human or animal. External object 50 may therefore sometimes be referred to herein as user 50. In these scenarios, the amount of radio-frequency energy exposure at user 50 may be characterized by one or more radio-frequency (RF) exposure metrics. The RF exposure metrics may include specific absorption rate (SAR) for radio-frequency signals at frequencies less than 6 GHz (in units of W/kg), maximum permissible exposure (MPE) for radio-frequency signals at frequencies greater than 6 GHz (in units of mW/cm$^2$), and total exposure ratio (TER), which combines SAR and MPE. Regulatory requirements (e.g., as imposed by governmental, regulatory, or industry standards or regulations for the region in which cell 40 is located) often impose limits on the amount of RF energy exposure permissible for external object 50 within the vicinity of the antennas on device 10 over a specified time period (e.g., SAR and MPE limits over a corresponding regulatory averaging period).

In general, the maximum radiated radio-frequency (RF) power allowed while maintaining compliance with regulatory requirements is a function of the position of device 10 relative to user 50, the current direction of signal beam 42 (as well as sidelobe levels of signal beam 42; the primary lobe of signal beam 42 is illustrated in FIG. 2), and the proximity of user 50 to the antennas on device 10 that produce signal beam 42. The RF energy exposure (e.g., the SAR and MPE) produced by device 10 primarily depends on the transmit power level of device 10 and the UL duty cycle of device 10. The transmit (uplink) power level of device 10 is provided by amplifiers (e.g., power amplifiers) in the transmit chain(s) of wireless circuitry 24 (FIG. 1). The duty cycle of device 10 is given by the fraction of the time resources for device 10 that are used for UL transmission (e.g., the fraction or percentage of the time slots in a given time period that the transmit chain(s) are actively transmitting radio-frequency signals).

In prior versions of the 3GPP TSSs, the power management term P-MPR (Power Management Maximum Power Reduction) is the only available resource for device 10 to ensure compliance with regulatory requirements on RF energy exposure. The power management term P-MPR (sometimes referred to herein as maximum power reduction MPR) in the 3GPP TSSs specifies a reduction in the maximum transmit power level for device 10 (e.g., so that subsequently-transmitted signals are transmitted at uplink power levels that are less than the maximum transmit power level $P_{CMAX}$ of device 10 minus the power reduction specified by the power management term P-MPR). This reduction in maximum transmit power level limits the amount of radio-frequency energy exposure for user 50 adjacent to device 10, thereby helping to ensure that device 10 satisfies the regulatory requirements on RF energy exposure.

However, performing RF exposure compliance in this way using only transmit power backoffs (maximum power reductions) can lead to reduced uplink coverage for device 10. For example, a transmit power backoff (MPR) of just 6 dB can result in a reduction in the uplink range of device 10 (e.g., the distance with which device 10 can transmit uplink signals that are received at base station 8 with satisfactory signal quality) of more than 30%. As another example, sudden and drastic reductions in UL transmit power through P-MPR (e.g., due to the sudden detected proximity of user 50 adjacent device 10 or within signal beam 42) can lead to radio link failure (RLF) with base station 8.

On the other hand, in prior versions of the 3GPP TSSs, the maximum UL duty cycle for device 10 remains static and is merely reported by device 10 to the network when device 10 transmits its UE capabilities to base station 8 (e.g., using the maxUplinkDutyCycle-FR2 term). The maxUplinkDuty-Cycle-FR2 term is only a single static limit that does not consider different use cases that can occur, and only defines a duty cycle limit at which device 10 will start applying transmit power backoffs (MPRs). When the maxUplinkDutyCycle-FR2 term is absent in the UE capabilities transmitted by device 10 to base station 8, then RF exposure requirements must be met using other means such as MPR. In addition, the maxUplinkDutyCycle-FR2 term does not allow for scaling the UL duty cycle dynamically to avoid transmit power backoffs in different situations. For example, the device can be located in different positions relative to the user's head or body, causing different amounts of RF energy exposure and consequently allowing for different UL duty cycle values while transmitting at a maximum transmit power level.

In addition, devices such as device 10 may apply sensing to detect whether or not external objects (e.g., a portion of user 50 such as the user's hand, finger, or head) are close to the device. The allowed level of RF energy exposure depends on the sensing result (e.g., if an object is close to the transmitting antenna(s) or not). Consequently, the device is required to scale the RF energy exposure accordingly, and such scaling would need to be performed dynamically. The maxUplinkDutyCycle-FR2 term defined in the 3GPP TSSs does not allow for scaling of RF exposure, considering dynamic situations where objects are being detected by the sensor or moving out of the sensor detection area. In order to mitigate these issues associated with only using MPR and a static maximum UL duty cycle, device 10 may dynamically adjust the UL duty cycle (e.g., the maximum UL duty cycle) used to transmit UL signals to base station 8 to satisfy the regulatory requirements on RF energy exposure.

In order to allow device 10 to dynamically adjust UL duty cycle, device 10 needs to rapidly coordinate with the network (e.g., base station 8) so the network can accommodate any changes (adjustments) to the UL duty cycle over time. If care is not taken, using a media access control (MAC) control element (CE) and radio resource control (RRC) interaction between device 10 and base station 8 can introduce an excessive amount of delay to the system. It may therefore be desirable to be able to coordinate dynamic UL duty cycle adjustment outside of the MAC CE and RRC interaction where possible.

Figure 3:
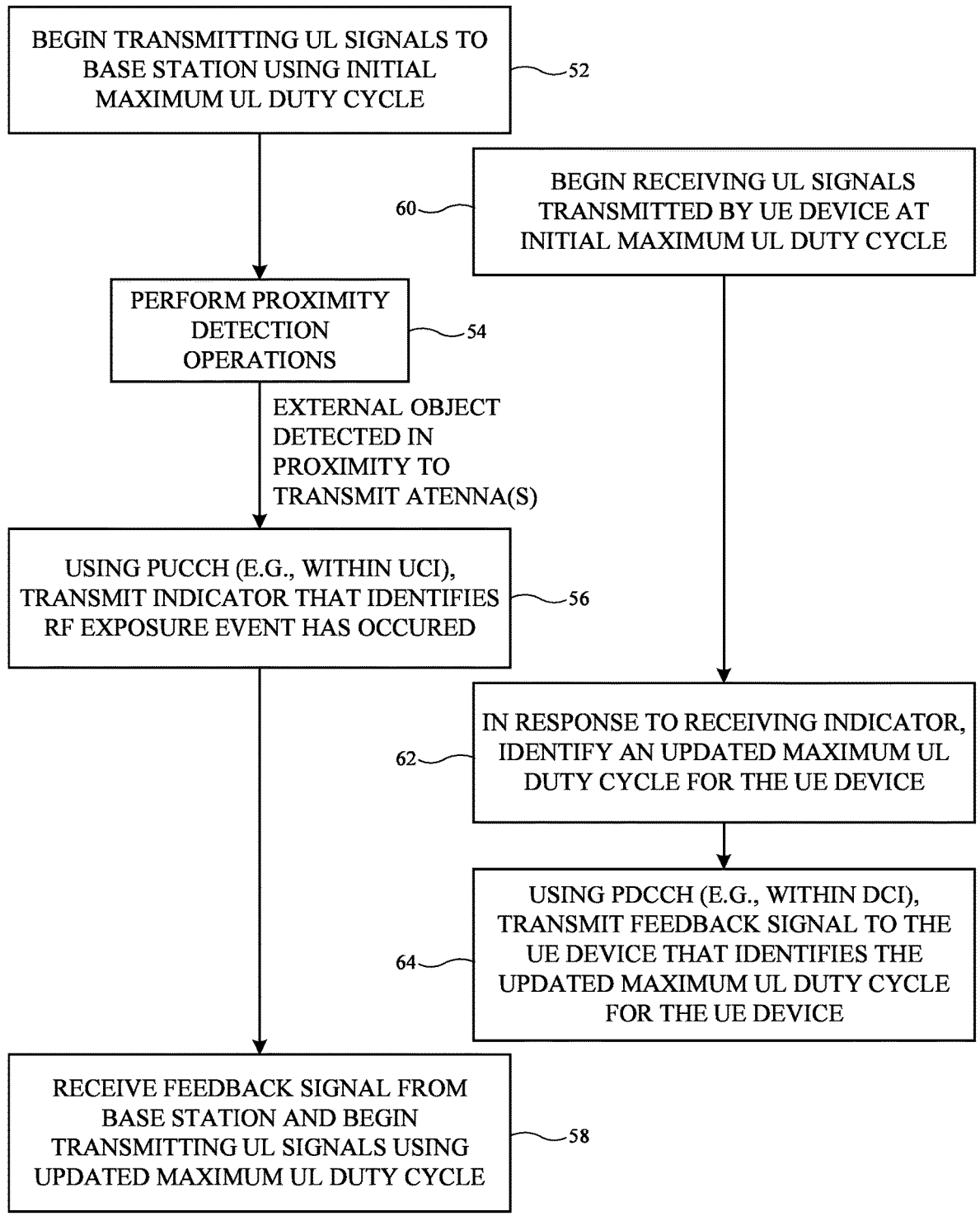
FIG. 3 is a flow chart of illustrative operations that may be performed by a base station and user equipment in using the physical uplink control channel (PUCCH) to coordinate a network-determined dynamic maximum uplink (UL) duty cycle adjustment for the user equipment in accordance with some embodiments.

FIG. 3 is a flow chart of illustrative operations that may be performed by network 6 to perform and coordinate dynamic UL duty cycle adjustments (e.g., outside of the MAC CE and RRC interaction). Operations 52-58 of FIG. 3 may be performed by device 10 while located in cell 40 for a corresponding base station 8. Operations 60-64 of FIG. 3 may be performed by the base station 8 in the cell 30 where device 10 is located.

At operation 52, device 10 may begin transmitting UL signals to base station 8 using an initial maximum UL duty cycle. The uplink transmissions may be performed according to a UL schedule generated by base station 8 and/or other portions of network 6, which grants time UL slots to device 10 that implement the initial maximum UL duty cycle (e.g., after a wireless connection has already been established between base station 8 and device 10). Base station 8 may begin receiving the UL signals transmitted by device 10 using the initial maximum UL duty cycle at operation 92.

At operation 54, device 10 may perform proximity detection operations to determine whether user 50 is at, adjacent, or proximate to the active (transmitting) antennas 30 on device 10 and/or signal beam 42. The proximity detection operations help device 10 to determine whether user 54 will be subject to RF energy exposure from signal beam 42, such that device 10 will begin to accumulate SAR and/or MPE from the presence of user 54. Such communications may be subject to regulations on RF energy exposure (e.g., SAR limits and/or MPE limits).

Device 10 may perform proximity detection operations using one or more image sensors, one or more capacitive proximity sensors, one or more voltage standing wave ratio (VSWR) sensors coupled to the active transmit antennas on device 10 (e.g., sensors that measure the amount of radio-frequency energy reflected from a transmit antenna back towards the transceiver due to the presence of external objects), one or more touch sensors integrated into or separate from a display for device 10, one or more acoustic (e.g., ultrasonic) sensors, one or more accelerometers, one or more gyroscopes, one or more sensors that gather wireless performance metric data such as receive signal strength indicator (RSSI) values or signal-to-noise ratio (SNR) values, information indicating that user 50 is currently providing user input to device 10, information indicating that user 50 is currently performing one or more software operations using software applications running on device 10, GPS data, one or more radar sensors, one or more light detection and ranging (Lidar) sensors, one or more infrared light or image sensors, one or more ambient light sensors, and/or any other desired sensors on or coupled to device 10 that can detect the presence of user 50 at, adjacent, or proximate to (e.g., within a threshold distance from) one or more of the antennas on device 10. The proximity detection operations may, if desired, distinguish between inanimate external objects and animate external objects (e.g., portions of the body of user 50).

When device 10 detects the presence of user 50 at, adjacent, or proximate to one or more of the antennas on device 10 (e.g., the active antennas being used to form signal beam 42), processing may proceed to operation 56. At operation 56, device 10 (e.g., 5G NR transceiver circuitry 28 and one or more antennas 30 of FIG. 1) may transmit an indicator to base station 8 that identifies that an RF exposure event has occurred at device 10 (e.g., an event in which device 10 will begin to accumulate SAR/MPE that is subject to regulatory limits on RF energy exposure). Device 10 may transmit the indicator as a single bit or a string (series) of bits that identifies that the RF exposure event has occurred. In the example of FIG. 3, device 10 transmits the indicator over a physical uplink control channel (PUCCH) (e.g., using PUCCH signals). Device 10 may, for example, transmit the indicator within the uplink control information (UCI) carried on the PUCCH.

At operation 62, base station 8 may receive the indicator transmitted by device 10 over the PUCCH. In this way, device 10 may inform base station 8 and network 6 that the device requires a reduction in its maximum UL duty cycle in order to comply with regulations on RF energy exposure in the presence of user 50 (e.g., the indicator over PUCCH may serve as a trigger for the network to adjust the maximum UL duty cycle of device 10). In response to receipt of the indicator, base station 8 and/or other portions of network 6 (e.g., the UL scheduler for base station 8) may identify an updated maximum UL duty cycle for device 10 that is lower than the initial UL duty cycle. The updated maximum UL duty cycle may, for example, be a maximum UL duty cycle that is supported by base station 8 and that will allow base station 8 to continue to communicate with device 10 while also accommodating communications with the other UE devices in cell 40. Base station 8 and/or other portions of network 6 may, for example, generate or update the UL schedule for device 10 and/or the other UE devices in cell 40 to implement/accommodate the updated maximum UL duty cycle to be used by device 10.

At operation 64, base station 8 (e.g., 5G NR transceiver circuitry and one or more of the antennas on base station 8) may transmit a feedback signal to device 10 (e.g., using DL resources that are allocated to the particular device 10 that transmitted the indicator to base station 8 at operation 56). The feedback signal may identify the updated maximum UL duty cycle to be used by device 10 (e.g., may identify an updated UL schedule or grant for device 10 to use that accommodates/implements the updated maximum UL duty cycle). In the example of FIG. 3, base station 8 transmits the feedback signal over a physical downlink control channel (PDCCH) (e.g., using PDCCH signals). Base station 8 may, for example, transmit the feedback signal within the downlink control information (DCI) carried on the PDCCH (e.g., as a series or string of bits).

At operation 58, device 10 may receive the feedback signal from base station 8 and may begin transmitting UL signals using the updated maximum UL duty cycle (e.g., implementing the updated UL schedule or grant generated by base station 8 and/or network 6). Device 10 may continue uplink communications using the updated maximum UL duty cycle while ensuring that any applicable regulations on RF energy exposure are satisfied, because the updated maximum UL duty cycle is lower than the initial maximum UL duty cycle and therefore produces less RF energy incident upon user 50. The updated maximum UL duty cycle may therefore sometimes be referred to herein as a reduced maximum UL duty cycle. Device 10 may continue to use the updated maximum UL duty cycle until user 50 is no longer detected at, adjacent, or proximate to the transmitting antennas or signal beam 42, until base station 8 instructs device 10 to use a different maximum UL duty cycle, or until any other desired trigger condition occurs.

Figure 4:
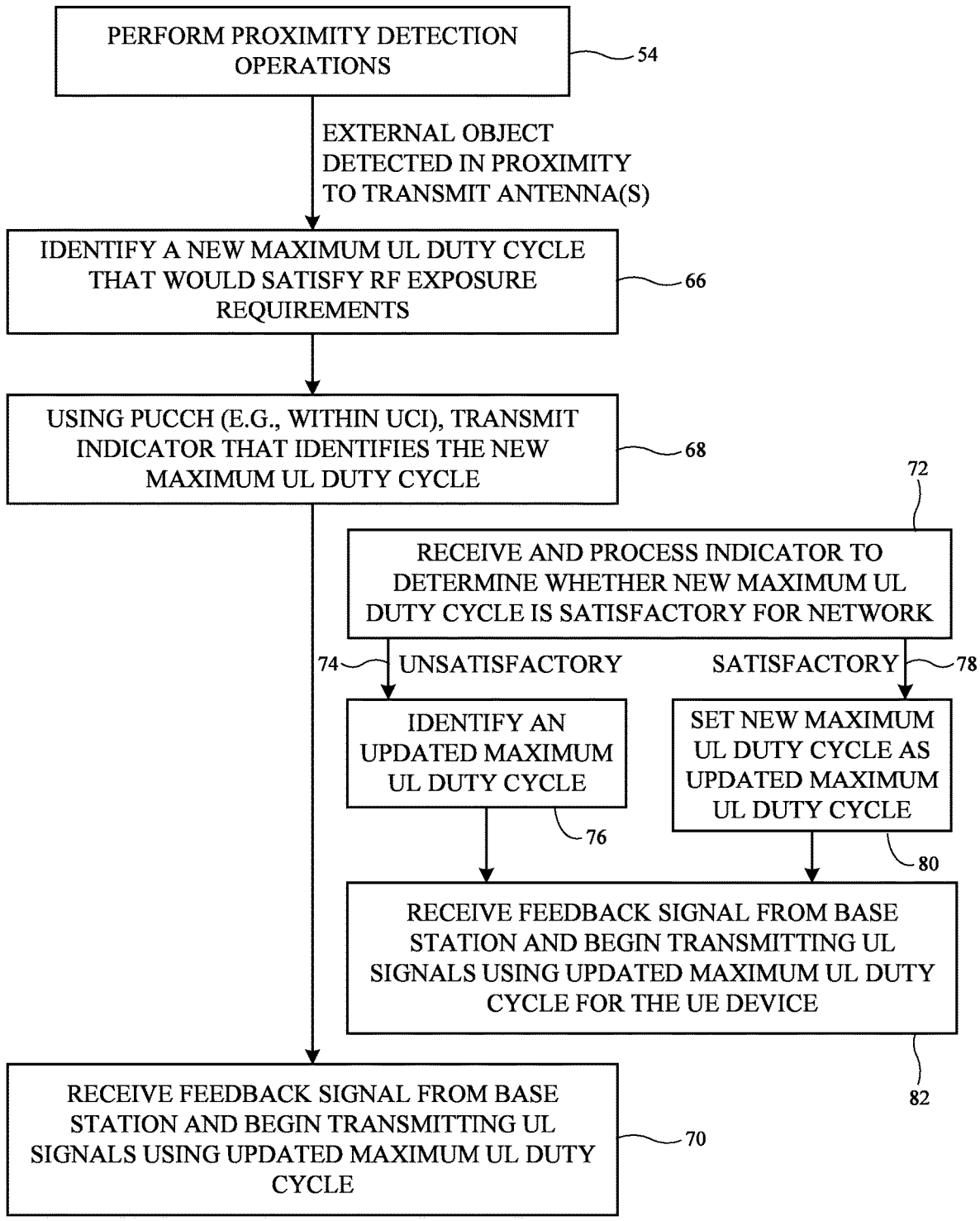
FIG. 4 is a flow chart of illustrative operations that may be performed by a base station and user equipment in using the PUCCH to coordinate a user equipment-determined dynamic maximum uplink (UL) duty cycle adjustment for the user equipment in accordance with some embodiments.

If desired, device 10 may suggest or request a particular updated UL duty cycle in response to detecting user 50 at, adjacent, or proximate to device 10, as shown in FIG. 4. Operations 54, 66, 68, and 70 of FIG. 4 may be performed by device 10. Operations 72-82 of FIG. 4 may be performed by base station 8 and/or other portions of network 6. Operations 52 and 60 of FIG. 3 are also performed during the operations of FIG. 4 but have been omitted from FIG. 4 for the sake of clarity.

Once device 10 has detected the presence of user 50 at operation 54, processing may then proceed to operation 66 of FIG. 4. At operation 66, control circuitry 14 on device 10 may identify a new maximum UL duty cycle for use during subsequent communications that is less than the initial maximum UL duty cycle. The new maximum UL duty cycle may sometimes be referred to herein as a suggested or requested maximum UL duty cycle. The new maximum UL duty cycle may be a maximum UL duty cycle that would be sufficiently low so as to allow device 10 to continue to transmit UL signals (e.g., using the new maximum UL duty cycle) while still satisfying regulatory limits on MPE/SAR despite the presence of user 50.

At operation 68, device 10 (e.g., 5G NR transceiver circuitry 28 and one or more antennas 30 of FIG. 1) may transmit an indicator to base station 8 that identifies the new maximum UL duty cycle. The indicator may include a single bit or a string (series) of bits that identifies that the new maximum UL duty cycle. In the example of FIG. 4, device 10 transmits the indicator over the physical uplink control channel (PUCCH) (e.g., using PUCCH signals). Device 10 may, for example, transmit the indicator within the uplink control information (UCI) carried on the PUCCH.

At operation 62, base station 8 may receive the indicator transmitted by device 10 over the PUCCH. In this way, device 10 may inform base station 8 and network 6 that the device requires a reduction in its maximum UL duty cycle as well as a reduced maximum UL duty cycle that would allow device 10 to continue to comply with regulations on RF energy exposure in the presence of user 50. In response to receipt of the indicator, base station 8 and/or other portions of network 6 (e.g., the UL scheduler for base station 8) may process the new maximum UL duty cycle identified by the indicator to determine whether use of the new maximum UL duty cycle for device 10 would be satisfactory for the network (e.g., given the current traffic load on base station 8 from any other UE devices in cell 40, load balancing policies for base station 8, etc.).

If the new maximum UL duty cycle identified by device 10 is unsatisfactory to network 6, processing may proceed to operation 76 via path 74. At operation 76, base station 8 and/or other portions of network 6 may identify an updated maximum UL duty cycle for device 10 that is lower than the initial UL duty cycle (e.g., that is supported by base station 8 and that will allow base station 8 to continue to communicate with device 10 while also accommodating communications with the other UE devices in cell 40). Base station 8 and/or other portions of network 6 may, for example, generate or update the UL schedule for device 10 and/or the other UE devices in cell 40 to implement/accommodate the updated maximum UL duty cycle to be used by device 10.

If the new maximum UL duty cycle identified by device 10 is satisfactory to network 6, processing may proceed from operation 72 to operation 80 via path 78. At operation 80, base station 8 and/or other portions of network 6 may set the new maximum UL duty cycle identified by device 10 as the updated maximum UL duty cycle (e.g., base station 8 may accept/acknowledge the new maximum UL duty cycle suggested by device 10 to allow device 10 to continue to satisfy SAR/MPE limits).

At operation 82, base station 8 may transmit a feedback signal to device 10 (e.g., using DL resources that are allocated to the particular device 10 that transmitted the indicator to base station 8 at operation 56). The feedback signal may identify the updated maximum UL duty cycle to be used by device 10. For example, base station 8 may acknowledge to device 10 that the new maximum UL duty cycle as identified by device 10 operation 66 has been accepted by the network for subsequent use by device 10 (e.g., using a single bit in the feedback signal) or may inform device 10 of a different maximum UL duty cycle to use as identified by base station 8 at operation 76 (e.g., using a series of bits in the feedback signal). In the example of FIG. 4, base station 8 transmits the feedback signal over a physical downlink control channel (PDCCH) (e.g., using PDCCH signals). Base station 8 may, for example, transmit the feedback signal within the downlink control information (DCI) carried on the PDCCH.

At operation 70, device 10 may receive the feedback signal from base station 8 and may begin transmitting UL signals using the updated maximum UL duty cycle (e.g., based on the updated UL schedule generated by base station 8 and/or network 6). Device 10 may continue uplink communications using the updated maximum UL duty cycle while ensuring that any applicable regulations on RF energy exposure are satisfied, because the updated maximum UL duty cycle is lower than the initial maximum UL duty cycle and therefore involves less RF energy being incident upon user 50. Device 10 may continue to use the updated maximum UL duty cycle until user 50 is no longer detected at, adjacent, or proximate to the transmitting antennas or signal beam 42, until base station 8 instructs device 10 to use a different maximum UL duty cycle, or until any other desired trigger condition occurs.

The examples of FIGS. 3 and 4 in which PUCCH/PDCCH are used by device 10 and base station 8 to coordinate dynamic adjustment to the maximum UL duty cycle used by device 10 are merely illustrative. If desired, the initial access process for device 10 and base station 8 may be used to coordinate dynamic adjustment to the maximum UL duty cycle used by device 10. For example, device 10 and base station 8 may use the random access channel (RACH) process to coordinate dynamic adjustment to the maximum UL duty cycle used by device 10.

Figure 5:
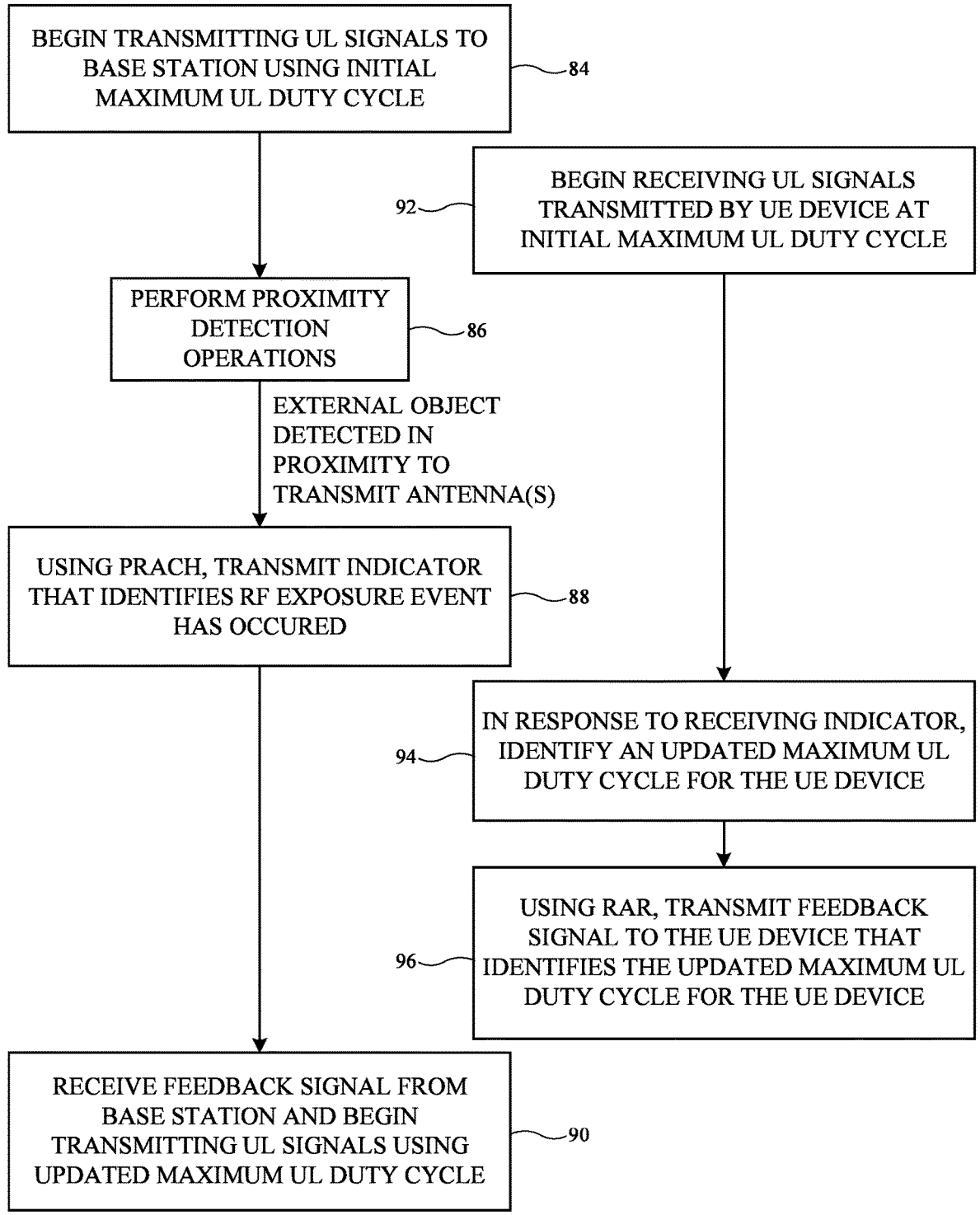
FIG. 5 is a flow chart of illustrative operations that may be performed by a base station and user equipment in using the physical random access channel (PRACH) to coordinate a network-determined dynamic maximum uplink (UL) duty cycle adjustment for the user equipment in accordance with some embodiments.

FIG. 5 is a flow chart of illustrative operations involved in using the RACH process to coordinate dynamic adjustment to the maximum UL duty cycle used by device 10. Operations 84-90 of FIG. 5 may be performed by device 10 while located in cell 40 for a corresponding base station 8. Operations 92-96 of FIG. 5 may be performed by the base station 8 in the cell 40 where device 10 is located.

At operation 84, device 10 may begin transmitting UL signals to base station 8 using an initial maximum UL duty cycle. Base station 8 may begin receiving the UL signals transmitted by device 10 using the initial maximum UL duty cycle at operation 92. Operations 84 and 92 may occur before device 10 has fully accessed and synchronized with network 6, for example. Alternatively, operations 84 and 92 may be omitted if desired.

At operation 86, device 10 may perform proximity detection operations to determine whether user 50 is at, adjacent, or proximate to the active (transmitting) antennas 30 on device 10 and/or signal beam 42. The proximity detection operations may include the same proximity detection operations as performed at operation 54 of FIGS. 3 and 4, for example.

When device 10 detects the presence of user 50 at, adjacent, or proximate to one or more of the antennas on device 10 (e.g., the active antennas being used to form signal beam 42), processing may proceed to operation 88. At operation 88, device 10 (e.g., 5G NR transceiver circuitry 28 and one or more antennas 30 of FIG. 1) may transmit an indicator to base station 8 that identifies that an RF exposure event has occurred at device 10 (e.g., an event in which device 10 will begin to accumulate SAR/MPE that is subject to regulatory limits on RF energy exposure). In the example of FIG. 5, device 10 transmits the indicator over a physical random access channel (PRACH) (e.g., using PRACH signals). In other words, the indicator transmitted by device 10 may be carried on the PRACH. Device 10 may transmit the indicator as a single bit or a string (series) of bits that identifies that the RF exposure event has occurred (e.g., within a PRACH preamble).

At operation 94, base station 8 may receive the indicator transmitted by device 10 over the PRACH. In this way, device 10 may inform base station 8 and network 6 that the device requires a reduction in its maximum UL duty cycle in order to comply with regulations on RF energy exposure in the presence of user 50. In response to receipt of the indicator, base station 8 and/or other portions of network 6 (e.g., the UL scheduler for base station 8) may identify an updated maximum UL duty cycle for device 10 that is lower than the initial UL duty cycle. The updated maximum UL duty cycle may, for example, be a maximum UL duty cycle that is supported by base station 8 and that will allow base station 8 to continue to communicate with device 10 while also accommodating communications with the other UE devices in cell 40. Base station 8 and/or other portions of network 6 may, for example, generate or update the UL schedule for device 10 and/or the other UE devices in cell 40 to implement/accommodate the updated maximum UL duty cycle to be used by device 10.

At operation 96, base station 8 may transmit a feedback signal to device 10 (e.g., to the specific device 10 that transmitted the indicator). The feedback signal may identify the updated maximum UL duty cycle to be used by device 10 (e.g., may identify an updated UL schedule or grant for device 10 that accommodates/implements the updated maximum UL duty cycle). In the example of FIG. 5, base station 8 transmits the feedback signal using a random access response (RAR) (e.g., a Msg2 RAR). In other words, the feedback signal (e.g., information identifying the updated maximum UL duty cycle) may be carried on a RAR.

At operation 90, device 10 may receive the feedback signal from base station 8 and may begin transmitting UL signals using the updated maximum UL duty cycle (e.g., implementing the updated UL schedule or grant generated by base station 8 and/or network 6). Device 10 may continue uplink communications using the updated maximum UL duty cycle while ensuring that any applicable regulations on RF energy exposure are satisfied, because the updated maximum UL duty cycle is lower than the initial maximum UL duty cycle and therefore involves less RF energy being incident upon user 50. The updated maximum UL duty cycle may therefore sometimes be referred to herein as a reduced maximum UL duty cycle. Device 10 may continue to use the updated maximum UL duty cycle until user 50 is no longer detected at, adjacent, or proximate to the transmitting antennas or signal beam 42, until base station 8 instructs device 10 to use a different maximum UL duty cycle, or until any other desired trigger condition occurs.

Figure 6:
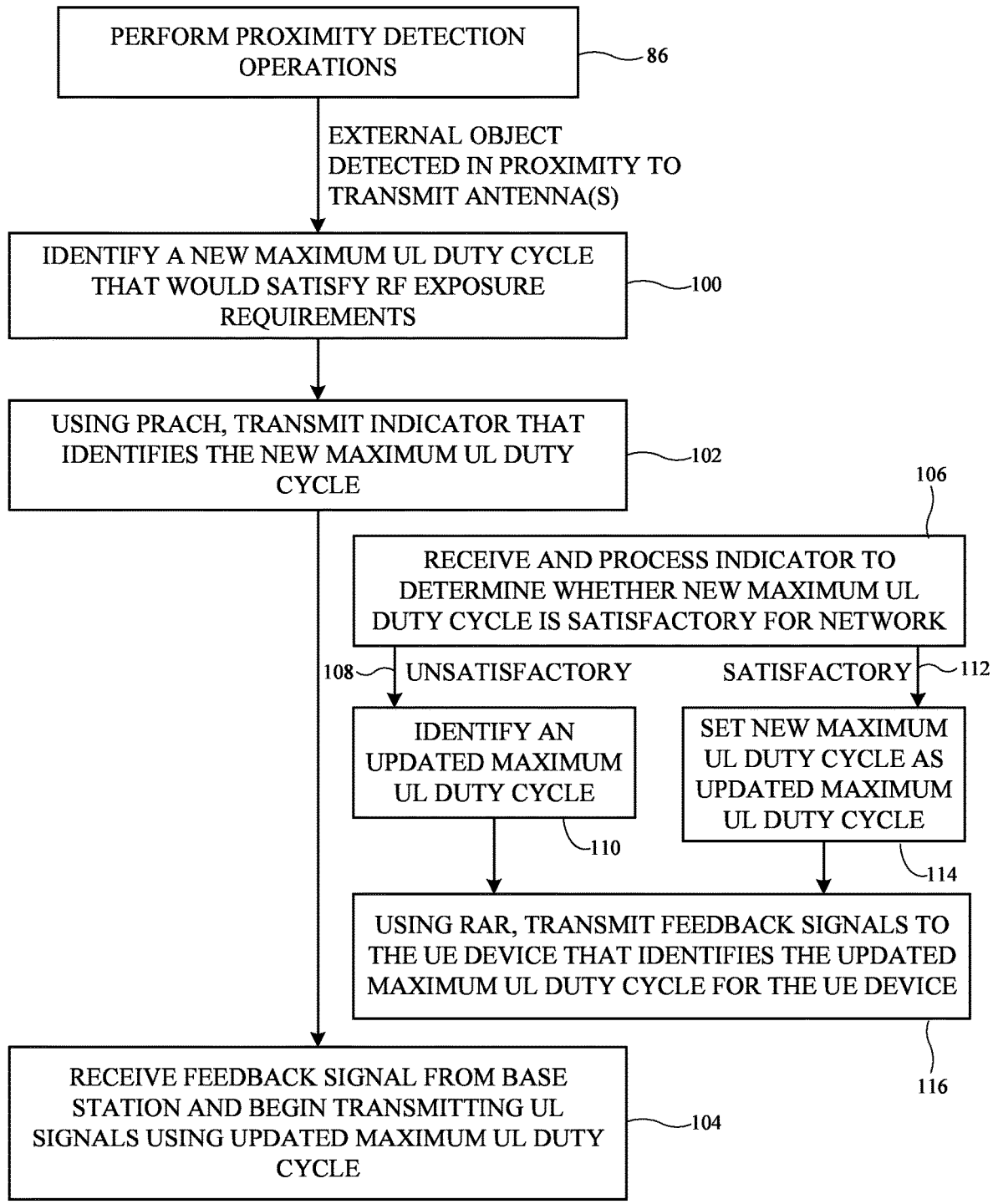
FIG. 6 is a flow chart of illustrative operations that may be performed by a base station and user equipment in using the PRACH to coordinate a user equipment-determined dynamic maximum uplink (UL) duty cycle adjustment for the user equipment in accordance with some embodiments.

If desired, device 10 may suggest or request a particular updated UL duty cycle in response to detecting user 50 at, adjacent, or proximate to device 10, as shown in FIG. 6. Operations 86 and 100-104 of FIG. 6 may be performed by device 10. Operations 106-116 of FIG. 6 may be performed by base station 8 and/or other portions of network 6.

Once device 10 has detected the presence of user 50 at operation 86, processing may then proceed to operation 100 of FIG. 6. At operation 86, control circuitry 14 on device 10 may identify a new maximum UL duty cycle for use during subsequent communications that is less than the initial maximum UL duty cycle. The new maximum UL duty cycle may sometimes be referred to herein as a suggested or requested maximum UL duty cycle. The new maximum UL duty cycle may be a maximum UL duty cycle that would be sufficiently low so as to allow device 10 to continue to transmit UL signals (e.g., using the new maximum UL duty cycle) while still satisfying regulatory limits on MPE/SAR despite the presence of user 50.

At operation 102, device 10 (e.g., 5G NR transceiver circuitry 28 and one or more antennas 30 of FIG. 1) may transmit an indicator to base station 8 that identifies the new maximum UL duty cycle. The indicator may include a single bit or a string (series) of bits that identifies that the new maximum UL duty cycle. In the example of FIG. 6, device 10 transmits the indicator over a physical random access channel (PRACH) (e.g., using PRACH signals). In other words, the indicator transmitted by device 10 may be carried on the PRACH.

At operation 106, base station 8 may receive the indicator transmitted by device 10 over the PRACH. In this way, device 10 may inform base station 8 and network 6 that the device requires a reduction in its maximum UL duty cycle as well as a reduced maximum UL duty cycle that would allow device 10 to continue to comply with regulations on RF energy exposure in the presence of user 50. In response to receipt of the indicator, base station 8 and/or other portions of network 6 (e.g., the UL scheduler for base station 8) may process the new maximum UL duty cycle identified by the indicator to determine whether the use of the new maximum UL duty cycle for device 10 would be satisfactory for the network (e.g., without unfairly interfering with the current traffic load on base station 8 from other UE devices in cell 40, based on the load balancing policies for base station 8, etc.).

If the new maximum UL duty cycle identified by device 10 is unsatisfactory to network 6, processing may proceed to operation 110 via path 108. At operation 110, base station 8 and/or other portions of network 6 may identify an updated maximum UL duty cycle for device 10 that is lower than the initial UL duty cycle (e.g., that is supported by base station 8 and that will allow base station 8 to continue to communicate with device 10 while also accommodating communications with the other UE devices in cell 40). Base station 8 and/or other portions of network 6 may, for example, generate or update the UL schedule for device 10 and/or the other UE devices in cell 40 to implement/accommodate the updated maximum UL duty cycle to be used by device 10.

If the new maximum UL duty cycle identified by device 10 is satisfactory to network 6, processing may proceed from operation 106 to operation 114 via path 112. At operation 114, base station 8 and/or other portions of network 6 may set the new maximum UL duty cycle identified by device 10 as the updated maximum UL duty cycle (e.g., base station 8 may accept/acknowledge the new maximum UL duty cycle suggested by device 10 to allow device 10 to continue to satisfy SAR/MPE limits).

At operation 116, base station 8 may transmit a feedback signal to device 10. The feedback signal may identify the updated maximum UL duty cycle to be used by device 10. In the example of FIG. 6, base station 8 transmits the feedback signal using a random access response (RAR) (e.g., a Msg2 RAR). In other words, the feedback signal (e.g., information identifying the updated maximum UL duty cycle) may be carried on a RAR. For example, base station 8 may acknowledge to device 10 that the new maximum UL duty cycle as identified by device 10 operation 100 has been accepted by the network for subsequent use by device 10 (e.g., using a single bit in the RAR message) or may inform device 10 of a different maximum UL duty cycle to use as identified by base station 8 at operation 110 (e.g., using a series of bits in the RAR message).

At operation 104, device 10 may receive the feedback signal from base station 8 and may begin transmitting UL signals using the updated maximum UL duty cycle (e.g., according to the updated UL schedule generated by base station 8 and/or network 6). Device 10 may continue uplink communications using the updated maximum UL duty cycle while ensuring that any applicable regulations on RF energy exposure are satisfied, because the updated maximum UL duty cycle is lower than the initial maximum UL duty cycle and therefore involves less RF energy being incident upon user 50. Device 10 may continue to use the updated maximum UL duty cycle until user 50 is no longer detected at, adjacent, or proximate to the transmitting antennas or signal beam 42, until base station 8 instructs device 10 to use a different maximum UL duty cycle, or until any other desired trigger condition occurs.

If desired, device 10 may perform dynamic scaling of the maximum UL duty cycle to maintain RF exposure within regulatory limits (e.g., without using MPR). Device 10 may, for example, calculate the level of RF exposure that is caused by device 10. This calculation may consider sensor data gathered by sensor(s) on device 10 (e.g., in input-output devices 18 of FIG. 1) indicative of the presence of user 50 or another external object nearby to the transmit antenna(s) on the device. The calculated level of RF exposure may include an absolute value and a relative value compared to the regulatory RF exposure limit.

Figure 7:
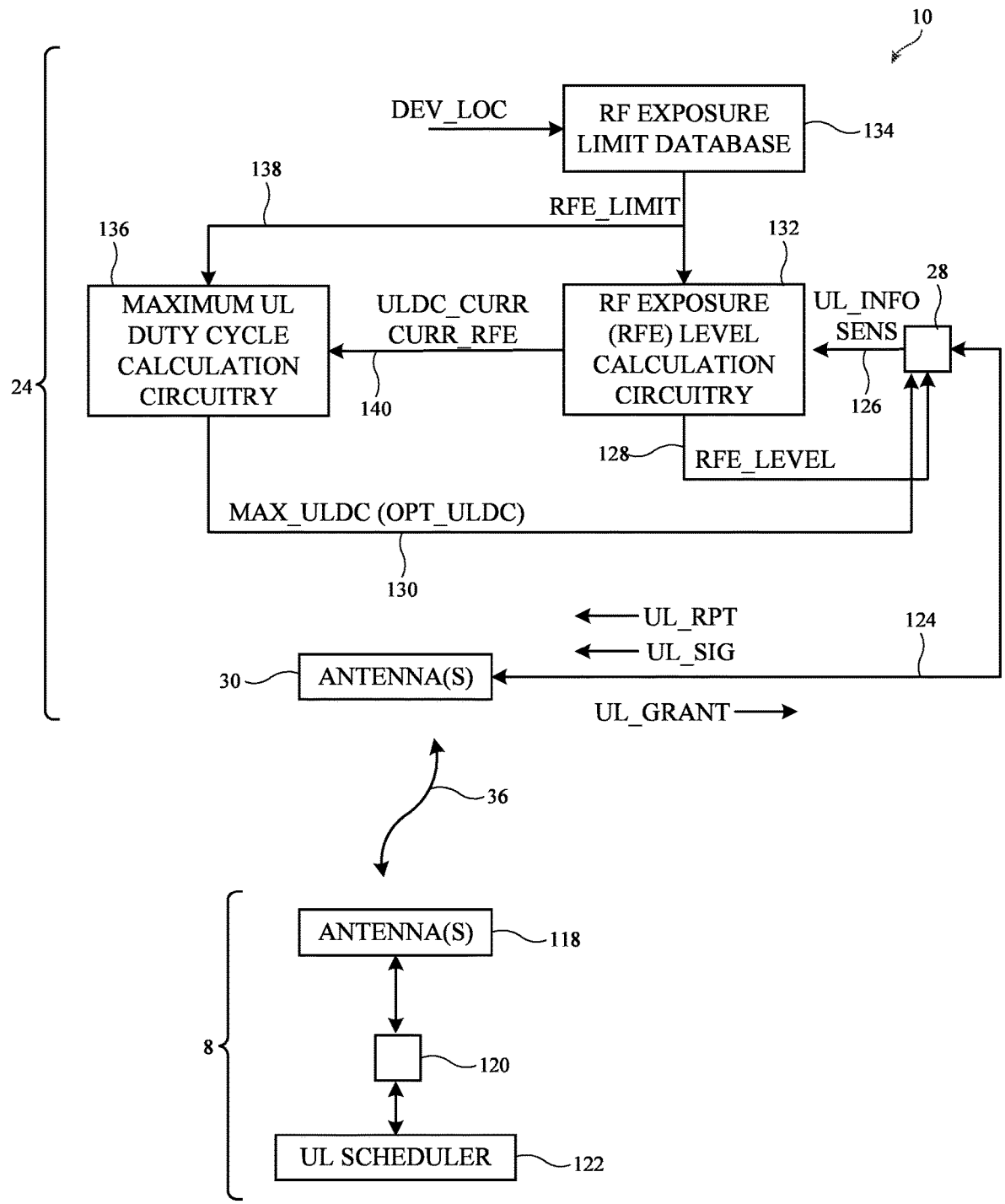
FIG. 7 is a circuit block diagram of illustrative wireless circuitry on user equipment for generating radio-frequency exposure (RFE) level information and uplink duty cycle information for transmission to a base station in accordance with some embodiments.

FIG. 7 is a diagram showing how wireless circuitry 24 on device 10 may include components for dynamically scaling of the maximum UL duty cycle to maintain RF exposure within regulatory limits. As shown in FIG. 7, wireless circuitry 24 may include maximum UL duty cycle calculation circuitry 136, RF exposure (RFE) level calculation circuitry 132, and RF exposure limit (rule) database 134. These components may be implemented in hardware (e.g., one or more processors, circuit components, logic gates, diodes, transistors, switches, arithmetic logic units (ALUs), registers, application-specific integrated circuits, field-programmable gate arrays, etc.) and/or software on device 10. Maximum UL duty calculation circuitry 136 may sometimes also be referred to herein as maximum UL duty cycle calculation engine 136 or maximum UL duty cycle calculator 136. RFE level calculation circuitry 132 may sometimes also be referred to herein as RFE level calculation engine 132 or RFE level calculator 132.

RF exposure limit database 134 may be coupled to maximum UL duty cycle calculation circuitry 136 and RFE level calculation circuitry 132 over control path 138. Maximum UL duty cycle calculation circuitry 136 may have an output coupled to 5G NR transceiver circuitry 28 (or other transceiver circuitry in device 10) over control path 130. RFE level calculation circuitry 132 may have a first output coupled to 5G NR transceiver circuitry 28 (or other transceiver circuitry in device 10) over control path 128 and may have a second output coupled to maximum UL duty cycle calculation circuitry 136 over control path 140. 5G NR transceiver circuitry 28 may be coupled to antenna(s) 30 over radio-frequency transmission line path(s) 124.

During UL transmission, 5G NR transceiver circuitry 28 may transmit uplink signals UL_SIG over radio-frequency transmission line path(s) 124 and antenna(s) 30 (e.g., using a selected/current UL duty cycle ULDC_CURR that is less than or equal to a current (e.g., initial) maximum UL duty cycle). Antenna(s) 30 may transmit uplink signals UL_SIG to base station 8 (e.g., over wireless link 36). As shown in FIG. 7, base station 8 may include antenna(s) 118, transceiver circuitry 120, and UL scheduler 122. This example is merely illustrative and, if desired, UL scheduler 122 may be located or distributed on other portions of network 6. Antenna(s) 118 may also transmit DL signals to antenna(s) 30 on device 10 (e.g., over wireless link 36). Antenna(s) 30 may pass the received DL signals to 5G NR transceiver circuitry 28 over radio-frequency transmission line path(s) 124.

RF exposure limit database 134 may be hard-coded or soft-coded into device 10 (e.g., in storage circuitry 16 of FIG. 1) and may include a database, data table, or any other desired data structure. RF exposure limit database 134 may store RF exposure rules associated with the operation of wireless circuitry 24 within different geographic regions. RF exposure limit database 134 may, for example, store regulatory SAR limits, regulatory MPE limits, and averaging periods for the SAR limits and MPE limits (sometimes collectively referred to herein as RF exposure limits RFE_LIMIT) for one or more geographic regions (e.g., countries, continents, states, localities, municipalities, provinces, sovereignties, etc.) that impose regulatory limits on the amount of RF energy exposure permissible user 50 within the vicinity of antenna(s) 30. As an example, RF exposure limit database 134 may store a first RF exposure limit RFE_LIMIT (e.g., a first SAR limit, a first MPE limit, and/or a first averaging period) imposed by the regulatory requirements of a first country, a second RF exposure limit RFE_LIMIT (e.g., a second SAR limit, a second MPE limit, and/or a second averaging period) imposed by the regulatory requirements of a second country, etc. The entries of RF exposure limit database 134 may be stored upon manufacture, assembly, testing, and/or calibration of device 10 and/or may be updated during the operation of device 10 over time (e.g., periodically or in response to a trigger condition such as a software update or the detection that device 10 has entered a new country for the first time).

If desired, RF exposure limit database 134 may receive a control signal DEV_LOC (e.g., from other portions of control circuitry 14 of FIG. 1) that identifies the current location of device 10. RF exposure limit database 134 may use control signal DEV_LOC to identify the particular RF exposure limit RFE_LIMIT applicable to device 10 within cell 40 (e.g., a particular averaging period, SAR limit, and/or MPE limit imposed by the corresponding regulatory body for the current location of device 10). RF exposure limit database 134 may provide the identified RF exposure limit RFE_LIMIT to maximum UL duty cycle calculation circuitry 136 and RFE level calculation circuitry 132 over control path 138. Control circuitry 14 may generate control signal DEV_LOC based on the current GPS location of device 10, sensor data such as compass or accelerometer data, a location of device 10 as identified by base station 8 or an access point in communication with device 10, and/or any other desired information indicative of the geographic location of device 10. While RF exposure limit database 134 is sometimes described herein as providing data to other components (e.g., maximum UL duty cycle calculation circuitry 136 and RFE level calculation circuitry 132), one or more processors, memory controllers, or other components may actively access the databases, may retrieve the stored data from the database, and may pass the retrieved data to the other components for corresponding processing.

RFE level calculation circuitry 132 may receive uplink information UL_INFO from 5G NR transceiver circuitry 28 over control path 126. Uplink information UL_INFO may include information identifying the current UL duty cycle ULDC_CURR used by 5G NR transceiver circuitry 28 in transmitting uplink signals UL_SIG, information identifying the modulation scheme and/or modulation order used by 5G NR transceiver circuitry 28 in transmitting uplink signals UL_SIG, information identifying the transmit power level and/or maximum transmit power level used by 5G NR transceiver circuitry 28 in transmitting uplink signals UL_SIG, information identifying the frequency band(s) used by 5G NR transceiver circuitry 28 in transmitting uplink signals UL_SIG, and/or any other desired information associated with the transmission of uplink signals UL_SIG.

RFE level calculation circuitry 132 may also receive sensor data SENS over control path 126 (e.g., from 5G NR transceiver circuitry 28 or from sensor(s) located elsewhere on device 10). Sensor data SENS may, for example, be sensor data generated by one or more sensor(s) on device 10 in performing proximity detection operations (e.g., at operations 54 of FIGS. 3 and 4 and operations 86 of FIGS. 5 and 6). Sensor data SENS may therefore be indicative of the presence or absence of a portion the body of user 50, whether device 10 is being held by the user, whether device 10 is being held to the user's head, the distance between user 50 and device 10, etc.

RFE level calculation circuitry 132 may identify (e.g., generate, produce, calculate, deduce, derive, estimate, or compute) the current amount of RF exposure CURR_RFE produced by 5G NR transceiver circuitry 28 in transmitting uplink signals UL_SIG (e.g., over a corresponding averaging period) based on the information contained within the uplink information UL_INFO received from 5G NR transceiver circuitry 28 and based on sensor data SENS. The current amount of RF exposure CURR_RFE may depend on sensor data SENS (e.g., there may be more RF exposure when sensor data SENS indicates that user 50 is close to device 10, is holding device 10 to their head, etc. than when the sensor data indicates that user 50 is far from device 10, is not holding device 10, etc.). RFE level calculation circuitry 132 may also generate (e.g., identify, produce, calculate, deduce, derive, estimate, or compute) the current RF exposure level RFE_LEVEL of 5G NR transceiver circuitry 28 based on the current amount of RF exposure CURR_RFE and the RF exposure limit RFE_LIMIT received from RF exposure limit database 134. For example, RFE level calculation circuitry 132 may generate RF exposure level RFE_LEVEL using equation 1.

$$\text{RFE\_LEVEL} = \frac{\text{CURR\_RFE}}{\text{RFE\_LIMIT}} * 100\% \quad (1)$$

RFE level calculation circuitry 132 may, for example, include logic (e.g., digital logic) such as multipliers and dividers that generate RF exposure level RFE_LEVEL. RFE level calculation circuitry 132 may pass RF exposure level RFE_LEVEL to 5G NR transceiver circuitry 28 over control path 128. RFE level calculation circuitry 132 may also pass the current uplink duty cycle ULDC_CURR from uplink information UL_INFO and the current amount of RF exposure CURR_RFE to maximum UL duty cycle calculation circuitry 136 over control path 140.

Maximum UL duty cycle calculation circuitry 136 may generate (e.g., identify, produce, calculate, deduce, derive, estimate, or compute) a new (suggested/requested) maximum uplink duty cycle MAX_ULDC based on the current uplink duty cycle ULDC_CURR (e.g., as received from RFE level calculation circuitry 132), the current amount of RF exposure CURR_RFE received from RFE level calculation circuitry 132, and the RF exposure limit RFE_LIMIT received from RF exposure limit database 134. Maximum UL duty cycle calculation circuitry 136 may, for example, generate maximum uplink duty cycle MAX_ULDC using equation 2.

$$\text{MAX\_ULDC} = \frac{\text{RFE\_LIMIT}}{\text{CURR\_RFE}} * \text{ULDC\_CURR} \qquad (2)$$

Maximum UL duty cycle calculation circuitry 136 may, for example, include logic (e.g., digital logic) such as multipliers and dividers that generate maximum uplink duty cycle MAX_ULDC. Maximum UL duty cycle calculation circuitry 136 may pass maximum uplink duty cycle MAX_ULDC to 5G NR transceiver circuitry 28 over control path 130. Maximum uplink duty cycle MAX_ULDC may be a maximum uplink duty cycle that would allow device 10 to continue to perform UL transmission while satisfying the applicable regulatory limits on RF exposure given the current amount of RF exposure and the current UL duty cycle (e.g., without reducing the maximum transmit power level). Maximum UL duty cycle calculation circuitry 136 may, for example, generate maximum uplink duty cycle MAX_ULDC while processing operation 66 of FIG. 4 or operation 100 of FIG. 6.

Additionally or alternatively, maximum UL duty cycle calculation circuitry 136 may control (adjust) the UL duty cycle (e.g., the maximum uplink duty cycle) for other purposes, such as optimizing UL throughput for different usage scenarios. The UL throughput depends on the UL duty cycle, the applied modulation scheme (e.g., a quadrature phase-shift keying (QPSK) modulation scheme, quadrature amplitude modulation (QAM) schemes such as 16-QAM, 64-QAM, or 256-QAM, etc.), and the transmit power level. In scenarios where device 10 is relatively close to base station 8, the highest throughput can be achieved using a relatively high UL duty cycle and a relatively high modulation order, whereas only a relatively low transmit power level is required. On the other hand, in scenarios where device 10 is relatively far from base station 8, device 10 requires a relatively high transmit power level to close the link, whereas the highest UL throughput is achieved using a relatively low UL duty cycle and a relatively low modulation order such as QPSK (e.g., reducing UL duty cycle can increase coverage and throughput in far cell scenarios).

For this reason, maximum UL duty cycle calculation circuitry 136 may estimate the distance between device 10 and base station 8 within cell 40. Maximum UL duty cycle calculation circuitry 136 may estimate this distance by measuring the signal strength of DL signals received from base station 8 (e.g., RSSI values) and/or the pathloss associated with the received DL signals (e.g., because greater distances are correlated with lower RSSI values and higher pathlosses). Maximum UL duty cycle calculation circuitry 136 may then identify (e.g., produce, generate, compute, calculate, derive, deduce, etc.) an optimal uplink duty cycle OPT_ULDC (e.g., a path-loss optimized maximum uplink duty cycle) to use given the estimated distance or measured pathloss between device 10 and base station 8. While optimal uplink duty cycle OPT_ULDC is sometimes referred to herein as an optimal uplink duty cycle, optimal uplink duty cycle OPT_ULDC may be a maximum uplink duty cycle that has been optimized to account for the pathloss environment for device 10 in communicating with base station 8, for example.

Figure 8:
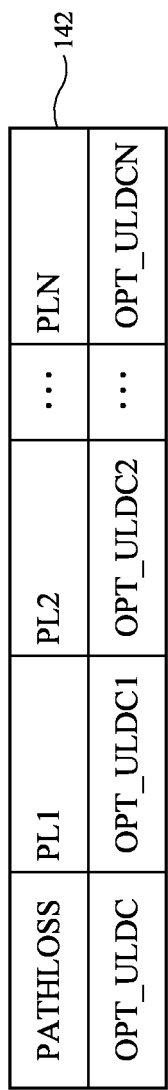
FIG. 8 is a table showing how illustrative user equipment may identify different optimal uplink duty cycles for different pathloss environments in accordance with some embodiments

If desired, maximum UL duty cycle calculation circuitry 136 may store a table such as table 142 of FIG. 8 that correlates different measured pathlosses PL with corresponding optimal UL duty cycles OPT_ULDC. Table 142 may be hard-coded or soft-coded into device 10 and may be implemented as a database, data table, or any other desired data structure. The entries of table 142 may be stored upon manufacture, assembly, testing, and/or calibration of device 10 and/or may be updated during the operation of device 10 over time. As shown in FIG. 8, maximum UL duty cycle calculation circuitry 136 may store optimal uplink duty cycles OPT_ULDC for each measured pathloss value PL (e.g., a first optimal uplink duty cycle OPT_ULDC to use when the measured pathloss has value PL1, a second optimal uplink duty cycle OPT_ULDC to use when the measured pathloss has value PL2, an Nth optimal uplink duty cycle OPT_ULDC to use when the measured pathloss has value PLN, etc.). Maximum UL duty cycle calculation circuitry 136 may identify the optimal uplink duty cycle to use based on the measured pathloss PL (e.g., circuitry 136 may identify that optimal uplink duty cycle OPT_ULDC1 should be used when pathloss PL1 is measured, may identify that optimal uplink duty cycle OPT_ULDC2 should be used when pathloss PL2 is measured, etc.).

Once maximum UL duty cycle calculation circuitry 136 has identified the optimal uplink duty cycle OPT_ULDC to use for the current measured pathloss, maximum UL duty cycle calculation circuitry 136 may then transmit the lower of maximum uplink duty cycle MAX_ULDC or optimal uplink duty cycle OPT_ULDC to 5G NR transceiver circuitry 28 over control path 130. Transmitting maximum uplink duty cycle MAX_ULDC (sometimes referred to herein as the RFE-related UL duty cycle) to 5G NR transceiver circuitry 28 when maximum uplink duty cycle MAX_ULDC is lower than optimal uplink duty cycle OPT_ULDC may serve to ensure RFE compliance for device 10. Transmitting optimal uplink duty cycle OPT_ULDC (sometimes referred to herein as the pathloss-related UL duty cycle or the pathloss-related maximum UL duty cycle) when optimal uplink duty cycle OPT_ULDC is lower than maximum uplink duty cycle MAX_ULDC may serve to maximize UL throughput.

5G NR transceiver circuitry 28 may transmit an uplink report UL_RPT to base station 8 over radio-frequency transmission line path(s) 124 and antenna(s) 30. Uplink report UL_RPT may include the RF exposure level RFE_LEVEL produced by RFE level calculation circuitry 132 and/or the maximum uplink duty cycle MAX_ULDC (or the optimal uplink duty cycle OPT_ULDC produced by maximum UL duty cycle calculation circuitry 136 when OPT_ULDC is less than MAX_ULDC). For example, a reporting entity on 5G NR transceiver circuitry 28 (e.g., within the baseband circuitry of 5G NR transceiver circuitry 28) or elsewhere in wireless circuitry 24 (e.g., interposed on control paths 128 and 130) may generate an uplink report UL_RPT containing information identifying RF exposure level RFE_LEVEL and/or maximum uplink duty cycle MAX_ULDC (or optimal uplink duty cycle OPT_ULDC) for transmission by antenna(s) 30 over wireless link 36. Uplink report UL_RPT may serve as a dynamic report to network 6 that informs network 6 of the RF exposure level RFE_LEVEL produced at device 10 and/or the maximum uplink duty cycle MAX_ULDC (or optimal uplink duty cycle OPT_ULDC) that device 10 can afford for maintaining RFE compliance (e.g., given the current pathloss environment) without using MPR.

Figure 9:
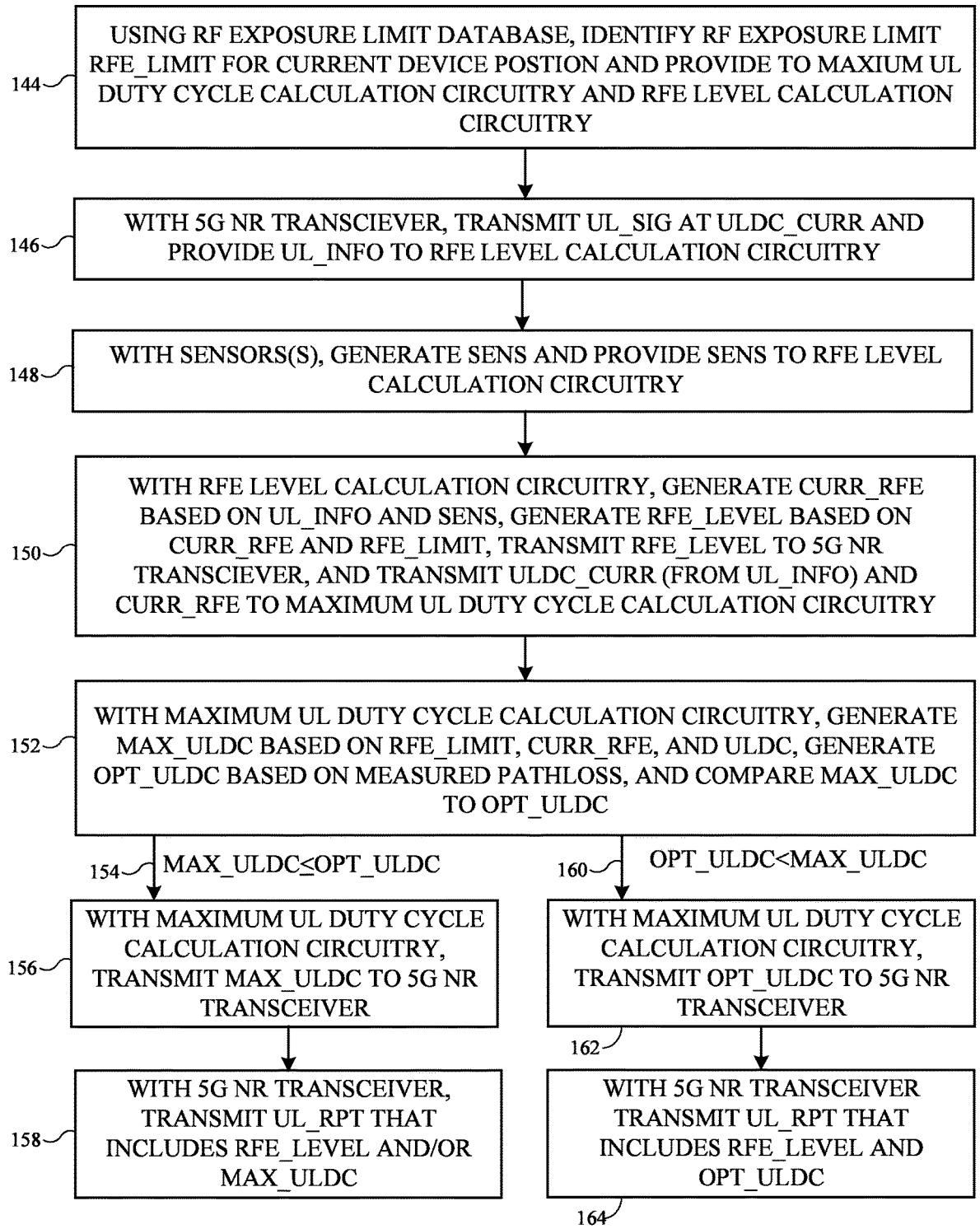
FIG. 9 is a flow chart of illustrative operations that may be performed by user equipment to report RFE level information and uplink duty cycle information for use in coordinating maximum UL duty cycle adjustments or other network adjustments in accordance with some embodiments.

FIG. 9 is a flow chart of illustrative operations that may be performed by wireless circuitry 24 on device 10 to generate uplink report UL_RPT for transmission to base station 8 (e.g., for dynamically adjusting the UL duty cycle of device 10 over time or for otherwise ensuring that device 10 is able to meet RFE requirements given its current RFE level and pathloss environment).

At operation 144, control circuitry 14 (FIG. 1) may use RF exposure limit database 134 to identify the RF exposure limit RFE_LIMIT (e.g., a SAR limit, MPE limit, and/or averaging period) imposed on device 10 within cell 40 (e.g., based on control signal DEV_LOC). RF exposure limit database 134 may pass RF exposure limit RFE_LIMIT to maximum UL duty cycle calculation circuitry 136 and RFE level calculation circuitry 132 over control path 138.

At operation 146, 5G NR transceiver circuitry 28 may begin transmitting uplink signals UL_SIG over antenna(s) 30 using a current (maximum) uplink duty cycle ULDC_CURR. 5G NR transceiver circuitry 28 may generate uplink information UL_INFO and may transmit uplink information UL_INFO to RFE level calculation circuitry 132 over control path 126. Uplink information UL_INFO may identify current uplink duty cycle ULDC_CURR and any other information used by RFE level calculation circuitry 132 to identify the current amount of RF exposure CURR_RFE.

At operation 148, sensor(s) on device 10 may generate sensor data SENS and may provide sensor data SENS to RFE level calculation circuitry 132. Operations 144-148 may be performed in any desired sequence or, if desired, two or more (e.g., all) of operations 144-148 may be performed concurrently (e.g., simultaneously) or in a time-interleaved manner.

At operation 150, RFE level calculation circuitry 132 may identify the current amount of RF exposure CURR_RFE based on uplink information UL_INFO and sensor data SENS. RFE level calculation circuitry 132 may then generate RF exposure level RFE_LEVEL based on the current amount of RF exposure CURR_RFE and RF exposure limit RFE_LIMIT (e.g., according to equation 1). RFE level calculation circuitry 132 may pass RF exposure level RFE_LEVEL to 5G NR transceiver circuitry 28 over control path 128. RFE level calculation circuitry 132 may pass the current (maximum) uplink duty cycle ULDC_CURR (e.g., as identified by uplink information UL_INFO) and the current amount of RF exposure CURR_RFE to maximum UL duty cycle calculation circuitry 136 over control path 140.

At operation 152, maximum UL duty cycle calculation circuitry 136 may generate maximum uplink duty cycle MAX_ULDC based on RF exposure limit RFE_LIMIT, current (maximum) uplink duty cycle ULDC_CURR, and the current amount of RF exposure CURR_RFE (e.g., according to equation 2). If desired, maximum UL duty cycle calculation circuitry 136 may also identify (e.g., estimate, compute, derive, calculate, deduce, etc.) the pathloss between device 10 and base station 8 (e.g., using gathered RS SI values or other wireless performance metric values). Maximum UL duty cycle calculation circuitry 136 may then identify the optimal uplink duty cycle OPT_ULDC corresponding to the estimated pathloss (e.g., using table 142 of FIG. 8). Maximum UL duty cycle calculation circuitry 136 may compare optimal uplink duty cycle OPT_ULDC to maximum uplink duty cycle MAX_ULDC.

If maximum uplink duty cycle MAX_ULDC is less than or equal to optimal uplink duty cycle OPT_ULDC, processing may proceed from operation 152 to operation 156 via path 154. At operation 156, maximum UL duty cycle calculation circuitry 136 may pass the generated maximum uplink duty cycle MAX_ULDC to 5G NR transceiver circuitry 28 over control path 130.

At operation 158, 5G NR transceiver circuitry 28 may transmit an uplink report UL_RPT over antenna(s) 30 that includes information identifying RF exposure level RFE_LEVEL (e.g., as generated by RFE level calculation circuitry 132) and/or maximum uplink duty cycle MAX_ULDC for subsequent processing by base station 8 and/or other portions of network 6.

If optimal uplink duty cycle OPT_ULDC is less than maximum uplink duty cycle MAX_ULDC, processing may proceed from operation 152 to operation 162 via path 160. At operation 162, maximum UL duty cycle calculation circuitry 136 may pass the identified optimal uplink duty cycle OPT_ULDC to 5G NR transceiver circuitry 28 over control path 130.

At operation 164, 5G NR transceiver circuitry 28 may transmit an uplink report UL_RPT over antenna(s) 30 that includes information identifying RF exposure level RFE_LEVEL (e.g., as generated by RFE level calculation circuitry 132) and/or optimal uplink duty cycle OPT_ULDC for subsequent processing by base station 8 and/or other portions of network 6.

The example of FIG. 9 is merely illustrative. If desired, maximum UL duty cycle calculation circuitry 136 may forego identification of optimal uplink duty cycle OPT_ULDC. In these examples, the comparison at operation 152 may be omitted and operations 162 and 164 may be omitted (e.g., processing may proceed directly from operation 152 to operation 156). If desired, device 10 may transmit only RF exposure level RFE_LEVEL within uplink report UL_RPT (e.g., without reporting MAX_ULDC or OPT_ULDC). In these examples, operations 152-164 may be omitted and device 10 may transmit uplink report UL_RPT at operation 150. If desired, device 10 may transmit only MAX_ULDC or OPT_ULDC within uplink report UL_RPT (e.g., without reporting RFE_LEVEL).

If desired, 5G NR transceiver circuitry 28 may transmit uplink report UL_RPT using MAC CE element signaling (e.g., MAC CE element signaling may be extended to report RF exposure level RFE_LEVEL and/or maximum uplink duty cycle MAX_ULDC or optimal uplink duty cycle OPT_ULDC). If desired, device 10 may transmit uplink report UL_RPT to base station 8 once at the beginning of communications with base station 8 and may then transmit subsequent uplink reports UL_RPT whenever the RF exposure level RFE_LEVEL and/or maximum uplink duty cycle MAX_ULDC (or optimal uplink duty cycle OPT_ULDC) change to a different value.

5G NR transceiver circuitry 28 may, for example, transmit uplink report UL_RPT as indicator(s) within a MAC CE element. The indicator(s) may include a first indicator identifying RF exposure level RFE_LEVEL and/or a second indicator identifying maximum UL duty cycle MAX_ULDC or optimal UL duty cycle OPT_ULDC. Each indicator may include, for example, a sequence/series of bits. As one example, the first indicator may be a 3-bit indicator. The second indicator may be a 3-bit indicator or a 4-bit indicator. These examples are merely illustrative and, in general, each indicator may have any desired number of bits.

Figure 10:
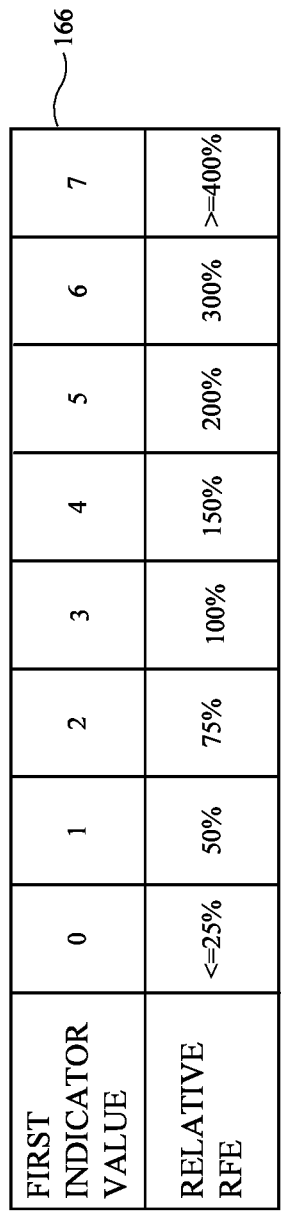
FIG. 10 is a table showing how illustrative user equipment may identify different RFE levels for a base station using different media access channel (MAC) control element (CE) indicator values in accordance with some embodiments.

FIG. 10 shows a table 166 illustrating one example of how the first indicator may be a 3-bit indicator for identifying different RF exposure levels RFE_LEVEL to base station 8. As shown in FIG. 10, the first indicator may have a first value (e.g., "0") when the RF exposure level RFE_LEVEL is at a first value (e.g., when the RF exposure level is less than or equal to 25% relative to RF exposure limit RFE_LIMIT), a second value (e.g., "1") when RF exposure level RFE_LEVEL is at a second value greater than the first value (e.g., when the RF exposure level is 50% relative to RF exposure limit RFE_LIMIT), a third value (e.g., "2") when RF exposure level RFE_LEVEL is at a third value greater than the second value (e.g., when the RF exposure level is at 75% relative to RF exposure limit RFE_LIMIT), a fourth value (e.g., "3") when RF exposure level RFE_LEVEL is at a fourth value greater than the third value (e.g., when the RF exposure level is at 100% relative to RF exposure limit RFE_LIMIT), a fifth value (e.g., "4") when RF exposure level RFE_LEVEL is at a fifth value greater than the fourth value (e.g., when the RF exposure level is at 150% relative to RF exposure limit RFE_LIMIT), a sixth value (e.g., "5") when RF exposure level RFE_LEVEL is at a sixth values greater than the fifth value (e.g., when the RF exposure level is at 200% relative to RF exposure limit RFE_LIMIT), a seventh value (e.g., "6") when RF exposure level RFE_LEVEL is at a seventh value greater than the sixth value (e.g., when the RF exposure level is at 300% relative to RF exposure limit RFE_LIMIT), or an eighth value (e.g., "7") when RF exposure level RFE_LEVEL is at an eighth value greater than the seventh value (e.g., when the RF exposure level is greater than or equal to 400% relative to RF exposure limit RFE_LIMIT). This example is merely illustrative and, in general, each value for the first indicator may correspond to any desired RF exposure levels RFE_LEVEL or may correspond to ranges of RF exposure levels RFE_LEVEL (e.g., where the RF exposure level RFE_LEVEL is rounded to the nearest value or the closest greater value in the second row of table 166). For example, if device 10 generates an RFE_LEVEL of 55%, the MAC CE may be provided with a first indicator value of "1" (which is the closest value in table 166 to 55%) or "2" (which is the closest greater value in table 166 to 55%). Rounding up to the closest greater value may allow device 10 with greater confidence that RFE limits will be met, for example. In general, the first indicator may include any desired number of bits to report RF exposure level with any desired granularity.

Figure 11:
FIGS. 11 and 12 are tables showing how illustrative user equipment may identify requested UL duty cycles for a base

FIG. 11 shows a table 168 illustrating one example of how the second indicator may be a 3-bit indicator for identifying different maximum uplink duty cycles MAX_ULDC or optimal uplink duty cycles OPT_ULDC to base station 8. As shown in FIG. 11, the first indicator may have a first value (e.g., "0") when the (new/suggested/requested) uplink duty cycle (e.g., maximum uplink duty cycle MAX_ULDC or optimal uplink duty cycle OPT_ULDC) is 5%, a second value when the uplink duty cycle is 10%, a third value when the uplink duty cycle is 15%, etc.

Figure 12:
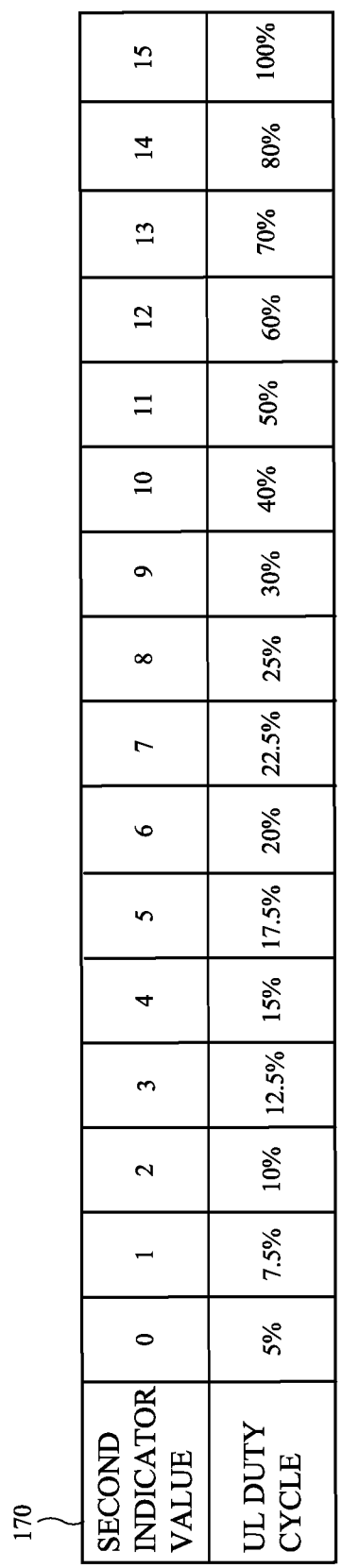

FIG. 12 shows a table 170 illustrating one example of how the second indicator may be a 4-bit indicator for identifying different maximum uplink duty cycles MAX_ULDC or optimal uplink duty cycles OPT_ULDC to base station 8 (e.g., with finer granularity than the 3-bit example of FIG. 11). As shown in FIG. 12, the first indicator may have a first value (e.g., "0") when the (new/suggested/requested) uplink duty cycle (e.g., maximum uplink duty cycle MAX_ULDC or optimal uplink duty cycle OPT_ULDC) is 5%, a second value when the uplink duty cycle is 7.5%, a third value when the uplink duty cycle is 10%, etc. In tables 168 and 170, a UL duty cycle of 100% corresponds to UL transmission by device 10 in all UL times slots. The examples of FIGS. 11 and 12 are merely illustrative and, in general, each value for the second indicator may correspond to any desired uplink duty cycles having any desired degree of coarseness. In general, the second indicator may include any desired number of bits to report RF exposure level with any desired granularity.

Figure 13:
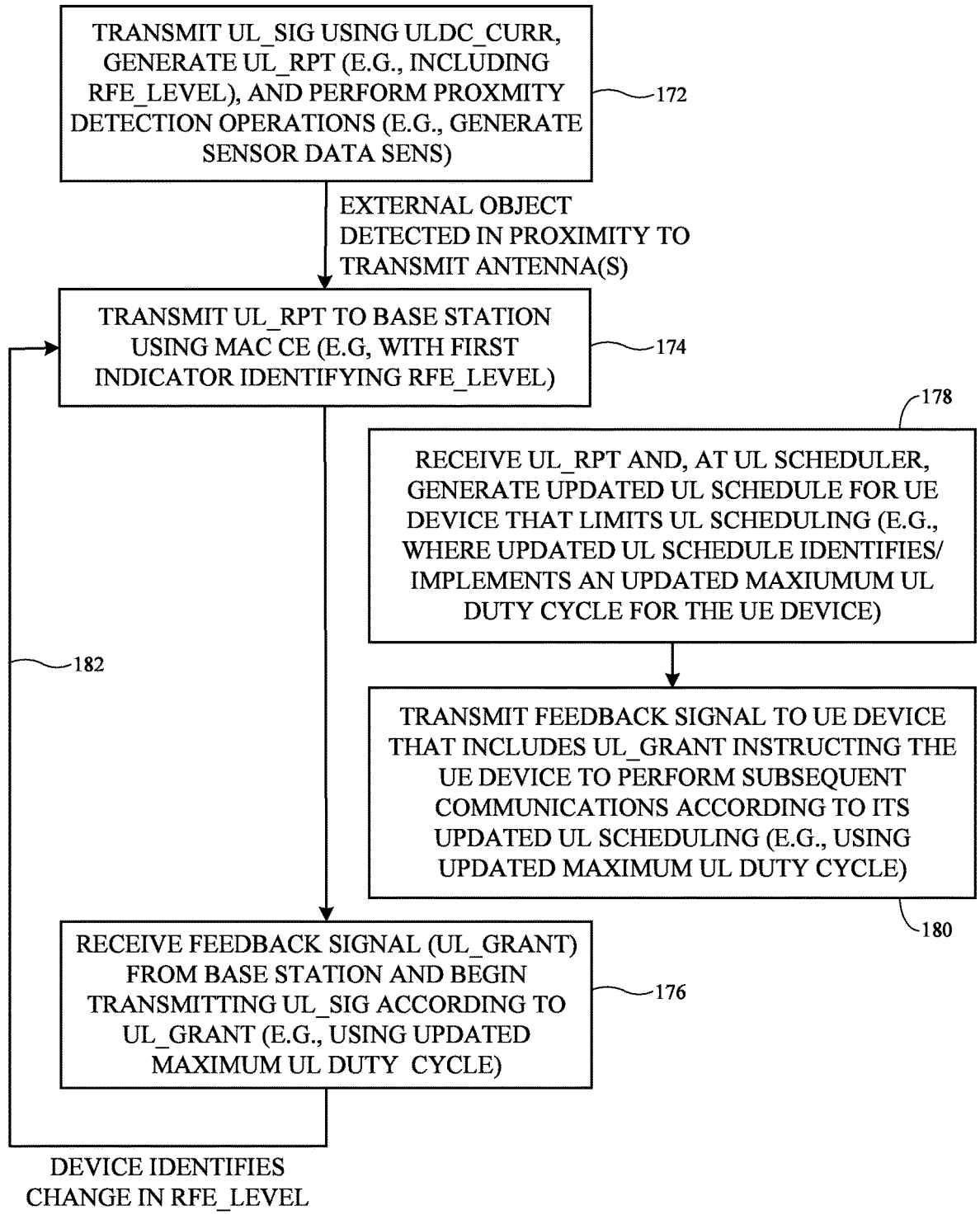
FIG. 13 is a flow chart of illustrative operations that may be performed by a base station and user equipment in using a MAC CE to report RFE level information for the user equipment to the base station in accordance with some embodiments.

FIG. 13 is a flow chart of illustrative operations involved in using the MAC CE to report RF exposure level RFE_LEVEL to base station 8 to allow base station 8 to adjust the UL duty cycle of device 10 or otherwise help to ensure that device 10 satisfies RFE regulations. Operations 172-176 of FIG. 13 may be performed by device 10. Operations 178 and 180 of FIG. 13 may be performed by base station 8 and/or other portions of network 6.

At operation 172, device 10 may transmit uplink signals UL_SIG using current maximum uplink duty cycle ULDC_CURR. Device 10 may gather sensor data SENS for performing proximity detection operations. Device 10 may begin to generate uplink reports such as uplink report UL_RPT. Uplink report UL_RPT may include information identifying the RF exposure level RFE_LEVEL produced by uplink signals UL_SIG. Once device 10 has detected an external object (e.g., user 50) at, adjacent, or proximate to the transmit antenna(s) on device 10 (e.g., while performing proximity detection operations), this may be indicative of a potential RFE event and processing may proceed to operation 174. Detection of the external object during proximity detection operations may sometimes be referred to herein as detection of an RFE event at device 10. This example is merely illustrative and, in general, processing may proceed to operation 174 in response to any desired trigger condition. As examples, processing may proceed to operation 174 in response to a decrease in UL transmit power (e.g., associated with device 10 being in close proximity to the base station), in response to detecting that device 10 is at a predetermined distance from base station 8 or in a predetermined pathloss condition (e.g., based on pathloss values generated at device 10, wireless performance metric data gathered at device 10, etc.), etc. In other words, detecting the proximity of external object 46 or a user need not be the trigger condition for beginning a dynamic adjustment to the UL duty cycle and coordination therefor with the network.

At operation 174, device 10 may transmit uplink report UL_RPT to base station 8 over a MAC CE. The uplink report UL_RPT may, for example, include a first indicator that identifies the RF exposure level RFE_LEVEL produced by device 10 (e.g., while processing operation 172).

At operation 178, base station 8 may receive uplink report UL_RPT from device 10. UL scheduler 122 (FIG. 7) may generate an updated UL schedule for the specific UE device that transmitted the uplink report (device 10) based on the RF exposure level RFE_LEVEL identified by the first indicator in uplink report UL_RPT. The updated UL schedule may include a limitation to the UL scheduling for device 10 (e.g., in the time domain), such that the updated UL schedule identifies/implements an updated maximum UL duty cycle for device 10 that is less than current maximum uplink duty cycle ULDC_CURR. If the current maximum UL duty cycle ULDC_CURR includes UL transmissions during every time slot over a given period, the updated maximum UL duty cycle may, for example, grant device 10 UL transmissions during 75% of the time slots over the given period, 50% of the time slots over the given period, etc.

At operation 180, base station 8 may transmit a feedback signal to device 10 that includes an uplink grant such as uplink grant UL_GRANT of FIG. 7 (e.g., over the PDCCH). Uplink grant UL_GRANT may instruct device 10 perform subsequent communications according to its updated UL schedule (e.g., using the updated maximum UL duty cycle implemented by the updated UL schedule).

At operation 176, device 10 may receive the feedback signal and uplink grant UL_GRANT from base station 8. Device 10 may then begin transmitting uplink signals UL_SIG according to uplink grant UL_GRANT (e.g., according to the updated UL schedule for device 10). Uplink grant UL_GRANT may configure device 10 to transmit uplink signals UL_SIG using the updated maximum UL duty cycle (e.g., by performing UL transmissions within time slots granted to device 10 by the updated UL schedule for device 10). In this way, device 10 may continue to perform UL transmission while satisfying regulatory limits on RF energy exposure and without reducing transmit power level.

Device 10 may continue to produce RF exposure values RFE_LEVEL during the processing of operations 174 and 176. Device 10 may continue to use the updated maximum UL duty cycle for uplink transmission until device 10 (e.g., RFE level calculation circuitry 132) identifies that there has been a change in RF exposure level RFE_LEVEL. Once there has been a change in RF exposure level RFE_LEVEL, device 10 may produce a new uplink report UL_RPT that identifies the new RF exposure level RFE_LEVEL and processing may loop back to operation 174 via path 182 to report the new RF exposure level RFE_LEVEL to base station 8 (e.g., using the new uplink report UL_RPT). Base station 8 may then accommodate the change in RF exposure level (e.g., by granting device 10 an increased maximum UL duty cycle when RF exposure level RFE_LEVEL decreases and/or a decreased maximum UL duty cycle when RF exposure level RFE_LEVEL increases).

The example of FIG. 13 is merely illustrative. The handshake procedure of operations 180 and 176 is not necessary and, if desired, operations 180 and 176 may be omitted. In these examples, the UL scheduler may simply begin to perform communications according to the updated UL schedule, which effectively configures device 10 to implement the updated maximum duty cycle, without confirming the change to device 10 in a separate DL transmission (feedback signal). If desired, the network may schedule other changes such as changes in the UL modulation scheme used by device 10 and/or an MPR for device 10 in addition to or instead of a change in UL duty cycle in order to allow device 10 to comply with RFE regulations while performing communications with satisfactory UL throughput given the current pathloss environment for device 10.

Figure 14:
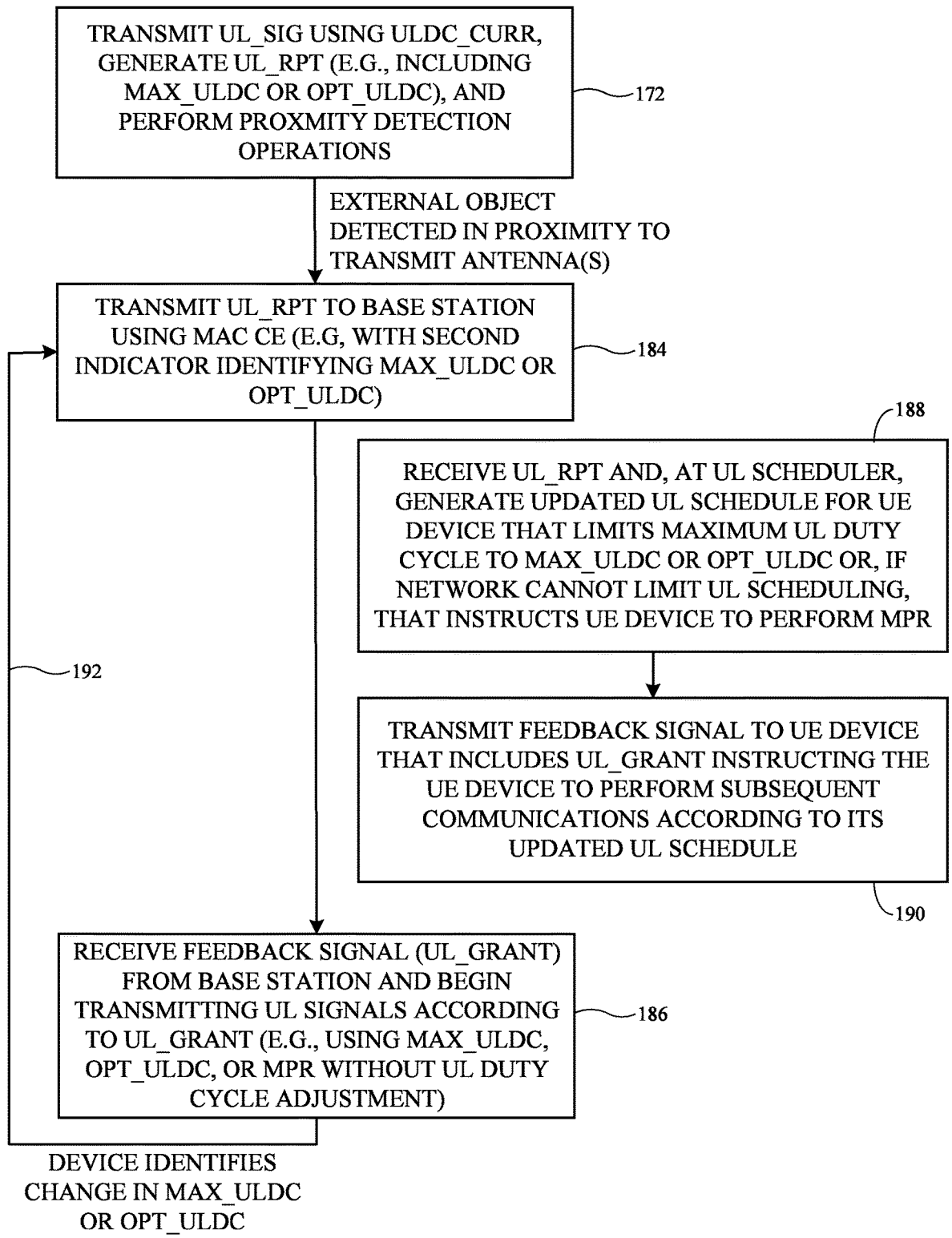
FIG. 14 is a flow chart of illustrative operations that may be performed by a base station and user equipment in using a MAC CE to report UL duty cycle information for the user equipment to the base station in accordance with some embodiments.

FIG. 14 is a flow chart of illustrative operations involved in using a MAC CE to report maximum uplink duty cycle MAX_ULDC or optimal uplink duty cycle OPT_ULDC to base station 8 to instruct base station 8 to adjust the UL duty cycle of device 10 to maximum uplink duty cycle MAX_ULDC or optimal uplink duty cycle OPT_ULDC. Operations 172, 184, and 186 of FIG. 14 may be performed by device 10. Operations 188 and 190 of FIG. 14 may be performed by base station 8 and/or other portions of network 6.

At operation 172, device 10 may transmit uplink signals UL_SIG using current maximum uplink duty cycle ULDC_CURR. Device 10 may gather sensor data SENS for performing proximity detection operations. Device 10 may begin to generate uplink reports such as uplink report UL_RPT. Uplink report UL_RPT may include information identifying maximum uplink duty cycle MAX_ULDC or optimal uplink duty cycle OPT_ULDC. Once device 10 has detected an external object (e.g., user 50) at, adjacent, or proximate to the transmit antenna(s) on device 10, this may be indicative of a potential RFE event and processing may proceed to operation 184. This example is merely illustrative and, in general, processing may proceed to operation 184 in response to any desired trigger condition. As examples, processing may proceed to operation 184 in response to a decrease in UL transmit power (e.g., associated with device 10 being in close proximity to the base station), in response to detecting that device 10 is at a predetermined distance from base station 8 or in a predetermined pathloss condition (e.g., based on pathloss values generated at device 10, wireless performance metric data gathered at device 10, etc.), etc. In other words, detecting the proximity of external object 46 or a user need not be the trigger condition for beginning a dynamic adjustment to the UL duty cycle and coordination therefor with the network.

At operation 184, device 10 may transmit uplink report UL_RPT to base station 8 over MAC CE. The uplink report UL_RPT may, for example, include a second indicator that identifies the maximum uplink duty cycle MAX_ULDC or optimal uplink duty cycle OPT_ULDC identified by device 10 (e.g., as produced while processing operation 172).

At operation 188, base station 8 may receive uplink report UL_RPT from device 10. UL scheduler 122 (FIG. 7) may generate an updated UL schedule for the specific UE device that transmitted the uplink report (device 10) based on the maximum uplink duty cycle MAX_ULDC or optimal uplink duty cycle OPT_ULDC identified by the second indicator in uplink report UL_RPT. The updated UL schedule may include a limitation to the UL scheduling for device 10 (e.g., in the time domain), such that the updated UL schedule identifies/implements maximum uplink duty cycle MAX_ULDC or optimal uplink duty cycle OPT_ULDC, as identified/requested by device 10.

If desired, base station 8 (e.g., UL scheduler 122) may determine whether base station 8 and/or network 6 is capable of limiting the UL scheduling for device 10 to implement maximum uplink duty cycle MAX_ULDC or optimal uplink duty cycle OPT_ULDC (e.g., by determining whether the new proposed uplink duty cycle is compatible with the capabilities of base station 8, whether the new proposed uplink duty cycle can be used without unfairly burdening communications for other UE devices in cell 40, whether load balancing within cell 40 would support the new proposed uplink duty cycle, etc.). If base station 8 or network 6 are incapable of limiting the UL scheduling for device 10 to implement maximum uplink duty cycle MAX_ULDC or optimal uplink duty cycle OPT_ULDC, the updated UL schedule for device 10 may call for a reduction in the maximum transmit power level of device 10 (e.g., an MPR) without a change to the UL duty cycle of device 10.

At operation 190, base station 8 may transmit a feedback signal to device 10 that includes an uplink grant such as uplink grant UL_GRANT of FIG. 7 (e.g., over the PDCCH). Uplink grant UL_GRANT may instruct device 10 to perform subsequent communications according to its updated UL schedule (e.g., using the maximum uplink duty cycle MAX_ULDC or optimal uplink duty cycle OPT_ULDC requested/proposed by device 10). If base station 8 or network 6 are incapable of limiting the UL scheduling for device 10 to implement maximum uplink duty cycle MAX_ULDC or optimal uplink duty cycle OPT_ULDC, the uplink grant UL_GRANT may instruct device 10 to perform subsequent communications using current maximum uplink duty cycle ULDC_CURR with an MPR.

At operation 186, device 10 may receive the feedback signal and uplink grant UL_GRANT from base station 8. Device 10 may then begin transmitting uplink signals UL_SIG according to uplink grant UL_GRANT (e.g., according to the updated UL schedule for device 10). Uplink grant UL_GRANT may configure device 10 to transmit uplink signals UL_SIG using maximum uplink duty cycle MAX_ULDC or optimal uplink duty cycle OPT_ULDC. If base station 8 or network 6 are incapable of limiting the UL scheduling for device 10 to implement maximum uplink duty cycle MAX_ULDC or optimal uplink duty cycle OPT_ULDC, the uplink grant UL_GRANT may configure device 10 to transmit the uplink signals using current uplink duty cycle ULDC_CURR with an MPR. In this way, device 10 may continue to perform UL transmission while satisfying regulatory limits on RF energy exposure. In addition, by identifying optimal uplink duty cycle OPT_ULDC in uplink report UL_RPT when optimal uplink duty cycle OPT_ULDC is less than maximum uplink duty cycle MAX_ULDC (e.g., while processing operation 152 of FIG. 9), device 10 may maximize its UL throughput regardless of the distance between device 10 and base station 8 within cell 40.

Device 10 may continue to produce maximum uplink duty cycles MAX_ULDC or optimal uplink duty cycles OPT_ULDC during the processing of operations 174 and 176. Device 10 may continue to use the maximum UL duty cycle granted in uplink grant UL_GRANT until device 10 (e.g., maximum UL duty cycle calculation circuitry 136) identifies that there has been a change in maximum uplink duty cycle MAX_ULDC or optimal uplink duty cycle OPT_ULDC. Once there has been a change in maximum uplink duty cycle MAX_ULDC or optimal uplink duty cycle OPT_ULDC, device 10 may produce a new uplink report UL_RPT that identifies the new maximum uplink duty cycle MAX_ULDC or optimal uplink duty cycle OPT_ULDC and processing may loop back to operation 184 via path 192 to report the new maximum uplink duty cycle MAX_ULDC or optimal uplink duty cycle OPT_ULDC to base station 8 (e.g., using the new uplink report UL_RPT). Base station 8 may then accommodate the change in maximum uplink duty cycle MAX_ULDC or optimal uplink duty cycle OPT_ULDC requested by device 10.

The example of FIG. 14 is merely illustrative. The handshake procedure of operations 190 and 186 is not necessary and, if desired, operations 190 and 186 may be omitted. In these examples, the UL scheduler may simply begin to perform communications according to the updated UL schedule, which effectively configures device 10 to implement MAX_ULDC or OPT_ULDC, without confirming the change to device 10 in a separate DL transmission (feedback signal). If desired, the network may schedule other changes such as changes in the UL modulation scheme used by device 10 and/or an MPR for device 10 in addition to or instead of a change in UL duty cycle in order to allow device 10 to comply with RFE regulations while performing communications with satisfactory UL throughput given the current pathloss environment for device 10.

The examples of FIGS. 13 and 14 may be combined if desired (e.g., by including both the first indicator identifying RF exposure level RFE_LEVEL and the second indicator identifying maximum uplink duty cycle MAX_ULDC or optimal uplink duty cycle OPT_ULDC in the uplink report UL_RPT transmitted over the MAC CE). In these examples, base station 8 may assign device 10 an updated maximum UL duty cycle as generated at base station 8, or that is equal to maximum uplink duty cycle MAX_ULDC or optimal uplink duty cycle OPT_ULDC, when the network is able to accommodate. If the network is unable to accommodate any change in the maximum UL duty cycle, base station 8 may instruct device 10 to perform an MPR without adjusting duty cycle to ensure that device 10 is able to continue to satisfy RFE regulations.

The methods and operations described above in connection with FIGS. 1-14 may be performed by the components of device 10 and/or base station 8 using software, firmware, and/or hardware (e.g., dedicated circuitry or hardware). Software code for performing these operations may be stored on non-transitory computer readable storage media (e.g., tangible computer readable storage media) stored on one or more of the components of device 10 (e.g., storage circuitry 20 of FIG. 1). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of device 10 and/or base station 8 (e.g., processing circuitry 22 of FIG. 1, etc.). The processing circuitry may include microprocessors, central processing units (CPUs), application-specific integrated circuits with processing circuitry, or other processing circuitry.

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more aspects, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary aspects are provided.

Example 1 includes a method of operating user equipment to communicate with a wireless base station, the method comprising: determining a preferred uplink (UL) duty cycle for use by the user equipment in transmitting uplink signals to the wireless base station; generating a message that identifies the preferred UL duty cycle; and transmitting the message to the wireless base station.

Example 2 includes the method of example 1 or some other example or combination of examples herein, wherein determining the preferred UL duty cycle comprises determining the preferred UL duty cycle based at least on a pathloss between the user equipment and the wireless base station.

Example 3 includes the method of examples 1 or 2 or some other example or combination of examples herein, wherein determining the preferred UL duty cycle comprises determining the preferred UL duty cycle based at least on a transmit power level of the user equipment.

Example 4 includes the method of any one of examples 1-3 or some other example or combination of examples herein, wherein determining the preferred UL duty cycle comprises determining the preferred UL duty cycle based at least on detection of a radio-frequency exposure (RFE) event at the user equipment.

Example 5 includes the method of any one of examples 1-4 or some other example or combination of examples herein, further comprising: detecting a radio-frequency exposure event associated with presence of an external object in proximity to the user equipment.

Example 6 includes the method of example 5 or some other example or combination of examples herein, further comprising: in response to detecting the radio-frequency exposure event, determining an additional preferred UL duty cycle for use by the user equipment in transmitting uplink signals to the wireless base station; generating an additional message that identifies the additional preferred UL duty cycle; and transmitting the additional message to the wireless base station.

Example 7 includes the method of any one of examples 1-6 or some other example or combination of examples herein, wherein transmitting the message to the wireless base station comprises transmitting the message over a physical uplink control channel (PUCCH).

Example 8 includes the method of example 7 or some other example or combination of examples herein, further comprising: receiving, over a physical downlink control channel (PDCCH), a feedback signal from the wireless base station indicative of acceptance, by the wireless base station, of the preferred UL duty cycle for the user equipment.

Example 9 includes the method of any one of examples 1-6 or some other example or combination of examples herein, wherein transmitting the message to the wireless base station comprises transmitting the message over a physical random access channel (PRACH).

Example 10 includes the method of example 9 or some other example or combination of examples herein, further comprising: receiving a random access response (RAR) from the wireless base station indicative of acceptance, by the wireless base station, of the preferred UL duty cycle for the user equipment.

Example 11 includes the method of any one of examples 1-6 or some other example or combination of examples herein, wherein transmitting the message to the wireless base station comprises transmitting the message in a media access control (MAC) control element (CE).

Example 12 includes the method of example 11 or some other example or combination of examples herein, further comprising: receiving, over a physical downlink control channel (PDCCH), a feedback signal from the wireless base station indicative of acceptance, by the wireless base station, of the preferred UL duty cycle for the user equipment.

Example 13 includes a method of operating user equipment to communicate with a wireless base station, the method comprising: wirelessly transmitting an indicator to the wireless base station, the indicator being indicative of the user equipment requesting an updated maximum uplink (UL) duty cycle for use by the user equipment during a subsequent UL transmission; and after transmitting the indicator to the wireless base station, transmitting UL signals to the wireless base station using the updated maximum UL duty cycle.

Example 14 includes the method of example 13 or some other example or combination of examples herein, wherein wirelessly transmitting the indicator comprises wirelessly transmitting the indicator in response to detecting a radio-frequency exposure (RFE) event associated with presence of an external object in proximity to the user equipment and wherein the indicator identifies that the user equipment has detected the RFE event.

Example 15 includes the method of example 14 or some other example or combination of examples herein, wherein the indicator identifies an RFE level produced by the user equipment in transmitting the first UL signals.

Example 16 includes the method of example 15 or some other example or combination of examples herein, wherein the indicator comprises one or more bits in a media access control (MAC) control element (CE).

Example 17 includes the method of example 16 or some other example or combination of examples herein, further comprising: receiving, from the wireless base station and over a physical downlink control channel (PDCCH), a feedback signal identifying the updated maximum UL duty cycle.

Example 18 includes the method of example 16 or some other example or combination of examples herein, wherein the indicator comprises a 3-bit indicator.

Example 19 includes the method of example 14 or some other example or combination of examples herein, wherein transmitting the indicator comprises transmitting the indicator over a physical uplink control channel (PUCCH).

Example 20 includes the method of example 19 or some other example or combination of examples herein, wherein transmitting the indicator over the PUCCH comprises transmitting the indicator as one or more bits in uplink control information (UCI) of the PUCCH.

Example 21 includes the method of example 19 or some other example or combination of examples herein, further comprising: receiving, from the wireless base station and over a physical downlink control channel (PDCCH), a feedback signal identifying the updated maximum UL duty cycle.

Example 22 includes the method of example 21 or some other example or combination of examples herein, wherein the feedback signal comprises one or more bits in downlink control information (DCI) of the PDCCH.

Example 23 includes the method of example 14 or some other example or combination of examples herein, wherein transmitting the indicator comprises transmitting the indicator over a physical random access channel (PRACH).

Example 24 includes the method of example 23 or some other example or combination of examples herein, further comprising: receiving, from the wireless base station, a random access response (RAR) identifying the second maximum UL duty cycle.

Example 25 includes the method of example 14 or some other example or combination of examples herein, further comprising: in response to detecting the RFE event, identifying a suggested maximum UL duty cycle that allows the user equipment to satisfy a predetermined limit on RFE.

Example 26 includes the method of example 13 or some other example or combination of examples herein, wherein the indicator identifies the suggested maximum UL duty cycle.

Example 27 includes the method of example 26 or some other example or combination of examples herein, further comprising: receiving, from the wireless base station, a feedback signal identifying that the wireless base station has accepted use, by the user equipment, of the suggested maximum UL duty cycle as the updated maximum UL duty cycle.

Example 28 includes the method of example 27 or some other example or combination of examples herein, wherein transmitting the indicator comprises transmitting the indicator over a physical uplink control channel (PUCCH) and wherein receiving the feedback signal comprises receiving the feedback signal over a physical downlink control channel (PDCCH).

Example 29 includes the method of example 27 or some other example or combination of examples herein, wherein transmitting the indicator comprises transmitting the indicator over a random access channel (RACH) and wherein receiving the feedback signal comprises receiving a random access response (RAR).

Example 30 includes the method of example 27 or some other example or combination of examples herein, wherein transmitting the indicator comprises transmitting the indicator in a media access control (MAC) control element (CE) and wherein receiving the feedback signal comprises receiving the feedback signal over a physical downlink control channel (PDCCH).

Example 31 includes the method of example 26 or some other example or combination of examples herein, further comprising: receiving, from the wireless base station, a feedback signal identifying the updated maximum UL duty cycle, wherein the suggested maximum UL duty cycle is different from the updated maximum UL duty cycle.

Example 32 includes the method of example 31 or some other example or combination of examples herein, wherein transmitting the indicator comprises transmitting the indicator over a physical uplink control channel (PUCCH) and wherein receiving the feedback signal comprises receiving the feedback signal over a physical downlink control channel (PDCCH).

Example 33 includes the method of example 31 or some other example or combination of examples herein, wherein transmitting the indicator comprises transmitting the indicator over a random access channel (RACH) and wherein receiving the feedback signal comprises receiving a random access response (RAR).

Example 34 includes the method of example 31 or some other example or combination of examples herein, wherein transmitting the indicator comprises transmitting the indicator in a media access control (MAC) control element (CE) and wherein receiving the feedback signal comprises receiving the feedback signal over a physical downlink control channel (PDCCH).

Example 35 includes the method of example 26 or some other example or combination of examples herein, wherein the indicator comprises a plurality of bits in a media access control (MAC) control element (CE).

Example 36 includes the method of example 35 or some other example or combination of examples herein, further comprising: receiving, from the wireless base station and over a physical downlink control channel (PDCCH), a feedback signal identifying that the wireless base station has accepted use, by the user equipment, of the suggested maximum UL duty cycle as the updated maximum UL duty cycle.

Example 37 includes the method of example 35 or some other example or combination of examples herein, further comprising: receiving, from the wireless base station and over a physical downlink control channel (PDCCH), a feedback signal identifying the updated maximum UL duty cycle, wherein the updated maximum UL duty cycle is different from the suggested maximum UL duty cycle.

Example 38 includes the method of example 35 or some other example or combination of examples herein, wherein the indicator comprises a 3-bit indicator.

Example 39 includes the method of example 35 or some other example or combination of examples herein, wherein the indicator comprises a 4-bit indicator.

Example 40 includes the method of example 13 or some other example or combination of examples herein, wherein the updated maximum UL duty cycle is less than an initial maximum UL duty cycle used by the user equipment for UL transmission prior to transmitting the indicator.

Example 41 includes a method of operating a wireless base station within a cell, the method comprising: receiving uplink (UL) signals transmitted using a first maximum UL duty cycle by a user equipment device in the cell; wirelessly receiving an indicator transmitted by the user equipment device; and generating, based on the indicator, a UL schedule for the user equipment device that implements a second maximum UL duty cycle that is less than the first maximum UL duty cycle.

Example 42 includes the method of example 41 or some other example or combination of examples herein, wherein the indicator comprises one or more bits transmitted by the user equipment device over a physical uplink control channel (PUCCH).

Example 43 includes the method of example 42 or some other example or combination of examples herein, further comprising: transmitting a feedback signal to the user equipment device over a physical downlink control channel (PDCCH), wherein the feedback signal instructs the user equipment device to transmit additional UL signals at the second maximum UL duty cycle.

Example 44 includes the method of example 43 or some other example or combination of examples herein, wherein the indicator identifies the second maximum UL duty cycle.

Example 45 includes the method of example 43 or some other example or combination of examples herein, wherein the indicator identifies a third maximum UL duty cycle that is different than the first maximum UL duty cycle and that is different than the second maximum UL duty cycle.

Example 46 includes the method of example 41 or some other example or combination of examples herein, wherein the indicator comprises one or more bits transmitted by the user equipment device over a random access channel (RACH).

Example 47 includes the method of example 46 or some other example or combination of examples herein, further comprising: transmitting a random access response (RAR) to the user equipment device, wherein the RAR instructs the user equipment device to transmit additional UL signals at the second maximum UL duty cycle.

Example 48 includes the method of example 47 or some other example or combination of examples herein, wherein the indicator identifies the second maximum UL duty cycle.

Example 49 includes the method of example 47 or some other example or combination of examples herein, wherein the indicator identifies a third maximum UL duty cycle that is different than the first maximum UL duty cycle and that is different than the second maximum UL duty cycle.

Example 50 includes the method of example 41 or some other example or combination of examples herein, wherein the indicator comprises one or more bits transmitted by the user equipment device in a media access control (MAC) control element (CE).

Example 51 includes the method of example 50 or some other example or combination of examples herein, further comprising: transmitting a feedback signal to the user equipment device over a physical downlink control channel (PDCCH), wherein the feedback signal instructs the user equipment device to transmit additional UL signals at the second maximum UL duty cycle.

Example 52 includes the method of example 51 or some other example or combination of examples herein, wherein the indicator identifies the second maximum UL duty cycle.

Example 53 includes the method of example 52 or some other example or combination of examples herein, further comprising: determining whether the wireless base station can support the second maximum UL duty cycle; generating the UL schedule when the wireless base station can support the second maximum UL cycle; and instructing the user equipment device to perform a maximum transmit power reduction when the wireless base station cannot support the second maximum UL cycle.

Example 54 includes the method of example 51 or some other example or combination of examples herein, wherein the indicator identifies a third maximum UL duty cycle that is different than the first maximum UL duty cycle and that is different than the second maximum UL duty cycle.

Example 55 includes the method of example 41 or some other example or combination of examples herein, wherein the indicator comprises a radio-frequency exposure (RFE) level produced by the user equipment device in transmitting the UL signals using the first maximum UL duty cycle.

Example 56 includes an electronic device operable in an environment that includes a wireless base station, the electronic device comprising: one or more antennas; one or more sensors configured to generate sensor data indicative of proximity of an external object to the one or more antennas; a transceiver configured to transmit uplink (UL) signals over the one or more antennas using a first maximum UL duty cycle; and one or more processors configured to generate a radio-frequency exposure (RFE) level based at least on the sensor data and the first maximum UL duty cycle, wherein the transceiver is configured to transmit information identifying the RFE level to the wireless base station.

Example 57 includes the electronic device of example 56 or some other example or combination of examples herein, wherein the one or more processors is further configured to: identify a current amount of RFE based at least on the sensor data and the first maximum UL duty cycle; and generate the RFE level based on the current amount of RFE and a predetermined RFE limit.

Example 58 includes the electronic device of example 57 or some other example or combination of examples herein, wherein the one or more processors is further configured to: generate a second maximum UL duty cycle that is different from the first maximum UL duty cycle based at least on the predetermined RFE limit, the current amount of RFE, and the first maximum UL duty cycle, wherein the transceiver is configured to transmit information identifying the second maximum UL duty cycle to the wireless base station.

Example 59 includes the electronic device of example 58 or some other example or combination of examples herein, wherein the one or more processors is further configured to: identify a pathloss between the electronic device and the wireless base station; and generate a third maximum UL duty cycle that is different from the first maximum UL duty cycle and the second maximum UL duty cycle based at least on the pathloss between the electronic device and the wireless base station.

Example 60 includes the electronic device of example 59 or some other example or combination of examples herein, wherein the transceiver is configured to: transmit the third maximum UL duty cycle to the wireless base station when the third maximum UL duty cycle is lower than the second maximum UL duty cycle.

Example 61 includes the electronic device of example 56 or some other example or combination of examples herein wherein, after transmitting the information identifying the RFE level, the transceiver is configured to receive an uplink grant from the wireless base station that instructs the transceiver to transmit additional UL signals over the one or more antennas using a second maximum UL duty cycle that is less than the first maximum UL duty cycle.

Example 62 includes the electronic device of example 56 or some other example or combination of examples herein, wherein the transceiver is configured to transmit the information identifying the RFE level using a media access control (MAC) control element (CE).

Example 63 may include an apparatus comprising means to perform one or more elements of a method described in or related to any of examples 1-62 or any combination thereof, or any other method or process described herein.

Example 64 may include one or more non-transitory computer-readable media comprising instructions to cause an electronic device, upon execution of the instructions by one or more processors of the electronic device, to perform one or more elements of a method described in or related to any of examples 1-62 or any combination thereof, or any other method or process described herein.

Example 65 may include an apparatus comprising logic, modules, or circuitry to perform one or more elements of a method described in or related to any of examples 1-62 or any combination thereof, or any other method or process described herein.

Example 66 may include a method, technique, or process as described in or related to any of examples 1-62 or any combination thereof, or portions or parts thereof.

Example 67 may include an apparatus comprising: one or more processors and one or more non-transitory computer-readable storage media comprising instructions that, when executed by the one or more processors, cause the one or more processors to perform the method, techniques, or process as described in or related to any of examples 1-62, or any combination thereof, or portions thereof.

Example 68 may include a signal as described in or related to any of examples 1-62, or any combination thereof, or portions or parts thereof.

Example 69 may include a datagram, information element, packet, frame, segment, PDU, or message as described in or related to any of examples 1-62, or any combination thereof, or portions or parts thereof, or otherwise described in the present disclosure.

Example 70 may include a signal encoded with data as described in or related to any of examples 1-62, or any combination thereof, or portions or parts thereof, or otherwise described in the present disclosure.

Example 71 may include a signal encoded with a datagram, IE, packet, frame, segment, PDU, or message as described in or related to any of examples 1-62, or any combination thereof, or portions or parts thereof, or otherwise described in the present disclosure.

Example 72 may include an electromagnetic signal carrying computer-readable instructions, wherein execution of the computer-readable instructions by one or more processors is to cause the one or more processors to perform the method, techniques, or process as described in or related to any of examples 1-62, or any combination thereof, or portions thereof.

Example 73 may include a computer program comprising instructions, wherein execution of the program by a processing element is to cause the processing element to carry out the method, techniques, or process as described in or related to any of examples 1-62, or any combination thereof, or portions thereof.

Example 74 may include a signal in a wireless network as shown and described herein.

Example 75 may include a method of communicating in a wireless network as shown and described herein.

Example 76 may include a system for providing wireless communication as shown and described herein.

Example 77 may include a device for providing wireless communication as shown and described herein.

Any of the above-described examples may be combined with any other example (or combination of examples), unless explicitly stated otherwise. The foregoing description of one or more implementations provides illustration and description but is not intended to be exhaustive or to limit the scope of aspects to the precise form disclosed.

The foregoing is merely illustrative and various modifications can be made by those skilled in the art without departing from the scope and spirit of the described embodiments. The foregoing embodiments may be implemented individually or in any combination.

What is claimed is:

1. An electronic device operable in an environment that includes a wireless base station, the electronic device comprising:
    one or more antennas;
    one or more sensors configured to generate sensor data; and
    a transmitter configured to
        transmit a first uplink (UL) signal over the one or more antennas using a maximum transmit power level of the transmitter and using a first maximum UL duty cycle, and
        transmit a second UL signal over the one or more antennas using the maximum transmit power level and using a second maximum UL duty cycle that is less than the first maximum UL duty cycle when the sensor data is indicative of an external object in proximity to the electronic device.

2. The electronic device of claim 1, wherein the transmitter is configured to transmit a signal to the wireless base station that identifies the second maximum UL duty cycle.

3. The electronic device of claim 2, wherein the signal includes a media access control (MAC) control element (CE).

4. The electronic device of claim 2, wherein the signal includes uplink control information (UCI) carried on a physical uplink control channel (PUCCH).

5. The electronic device of claim 1, wherein the transmitter is configured to transmit a first signal to the wireless base station that requests an updated UL duty cycle, the electronic device further comprising:
    a receiver configured to receive a second signal from the wireless base station that identifies the second maximum UL duty cycle.

6. The electronic device of claim 5, wherein the first signal includes a media access control (MAC) control element (CE).

7. The electronic device of claim 5, wherein the first signal includes uplink control information (UCI) carried on a physical uplink control channel (PUCCH).

8. The electronic device of claim 5, wherein the first signal includes radio-frequency exposure (RFE) information associated with the sensor data.

9. A method of operating an electronic device comprising:
    transmitting, using a transmitter, uplink (UL) signals to a wireless base station using one or more antennas, a maximum transmit power level, and a maximum UL duty cycle; and
    reducing, using the transmitter, the maximum UL duty cycle while maintaining the maximum transmit power level when an external object is in proximity to the one or more antennas.

10. The method of claim 9, further comprising:
    generating, using one or more sensors, sensor data, wherein reducing the maximum UL duty cycle while maintaining the maximum transmit power level comprises reducing the maximum UL duty cycle while maintaining the maximum transmit power level when the sensor data is indicative of the external object being in proximity to the one or more antennas.

11. The method of claim 9, further comprising:
    transmitting, using the transmitter, a report to the wireless base station that identifies a radio-frequency exposure (RFE) level associated with the external object being in proximity to the one or more antennas.

12. The method of claim 9, further comprising:
    transmitting, using the transmitter, a signal to the wireless base station that identifies an updated maximum UL duty cycle for the UL signals.

13. The method of claim 12, wherein transmitting the signal comprises transmitting the signal using a media access control (MAC) control element (CE).

14. The method of claim 12, wherein transmitting the signal comprises transmitting the signal using uplink control information (UCI) carried on a physical uplink control channel (PUCCH).

15. The method of claim 9, further comprising:
    transmitting, using the transmitter, a first signal to the wireless base station that requests an updated maximum UL duty cycle for the UL signals, wherein reducing the maximum UL duty cycle includes
        receiving a second signal from the wireless base station that identifies the updated maximum UL duty cycle, and
        transmitting the UL signals at the updated maximum UL duty cycle without reducing the maximum transmit power level.

16. The method of claim 15, wherein transmitting the first signal comprises transmitting the signal using a media access control (MAC) control element (CE).

17. The method of claim 15, wherein transmitting the first signal comprises transmitting the signal using uplink control information (UCI) carried on a physical uplink control channel (PUCCH).

* * * * *